United States Patent [19]
Mawatari et al.

[11] Patent Number: 5,566,379
[45] Date of Patent: Oct. 15, 1996

[54] ECONOMICAL RECORDING AND REPRODUCING APPARATUS WHICH PERFORMS REAL-TIME PROCESSING OF DIGITAL AUDIO DATA

[75] Inventors: Akinori Mawatari, Kodaira; Tetsuji Ono, Koganei; Hideo Kitayama, Tachikawa; Makoto Tsukada, Tokyo; Kazumu Abe, Sayama; Yoshinori Matsuoka, Tokyo; Toshio Mori, Tanashi; Tomoko Mita, Tokyo, all of Japan

[73] Assignee: Teac Corporation, Tokyo, Japan

[21] Appl. No.: 459,527

[22] Filed: Jun. 2, 1995

Related U.S. Application Data

[63] Continuation of Ser. No. 192,973, Feb. 7, 1994, abandoned.

[30] Foreign Application Priority Data

Feb. 9, 1993 [JP] Japan .................................. 5-021386

[51] Int. Cl.⁶ ............................... G11B 5/09; G11B 5/02
[52] U.S. Cl. .................... 360/48; 360/27; 369/48
[58] Field of Search ........................ 360/13, 32, 48, 360/27; 369/83, 48

[56] References Cited

U.S. PATENT DOCUMENTS 4,791,623  12/1988  Deiotte ................................ 360/48

FOREIGN PATENT DOCUMENTS 4-212767  8/1992  Japan .

Primary Examiner—W. Chris Kim
Attorney, Agent, or Firm—Michael N. Meller

[57] ABSTRACT

An audio signal recording and reproducing apparatus can perform realtime processing with a structure having a low cost. The audio signal recording and reproducing apparatus records a series of input audio signals as digital audio data, and reproduces and outputs the input signals using the recorded digital audio data as output audio signals. An input audio signal processing unit converts the series of input audio signals into digital audio data. A data file recording unit records the digital audio data, as digital audio data file information, on a recording medium, the recording medium having a plurality of clusters in which data having a predetermined number of bytes is recorded, the digital audio file information being recorded over a plurality of clusters. A file management information recording unit records on the recording medium file management information representing the reproducing order of the clusters in which the digital audio data file information is recorded. A directory information recording unit records on the recording medium directory information including at least the number of the first cluster recorded first when the digital audio data is recorded. A reproduction procedure file information recording unit records on the recording medium the reproduction procedure file information including at least the number of the first cluster of a digital audio data file to be reproduced. An output audio signal processing unit converts digital audio data, which is read out from the recording medium in accordance with the reproduction procedure file information, into output audio signals.

9 Claims, 19 Drawing Sheets

FIG.10

| ASSEMBLE SHEET NO. | PREVIOUS ASSEMBLE SHEET NO. | NEXT ASSEMBLE SHEET NO. | OTHER INFORMATION | |
|---|---|---|---|---|
| 0 | | 5 | · ASSEMBLE · CUE SHEET NO.<br>· REPRODUCTION START CLUSTER NO.<br>· NUMBER OF OFFSET BYTES<br>· NUMBER OF BYTES TO BE REPRODUCED<br>· REPRODUCTION START TIME | TRACK 1 (FIXED) |
| 1 | | 6 | | TRACK 2 (FIXED) |
| 2 | | 4 | | TRACK 3 (FIXED) |
| 3 | | FFFFh | | TRACK 4 (FIXED) |
| 4 | 2 | 7 | | |
| 5 | 0 | 8 | | |
| 6 | 1 | FFFFh | | |
| 7 | 4 | 9 | | |
| 8 | 5 | 10 | | |
| 9 | 7 | FFFFh | | |
| 10 | 8 | FFFFh | | |

FIG. 11
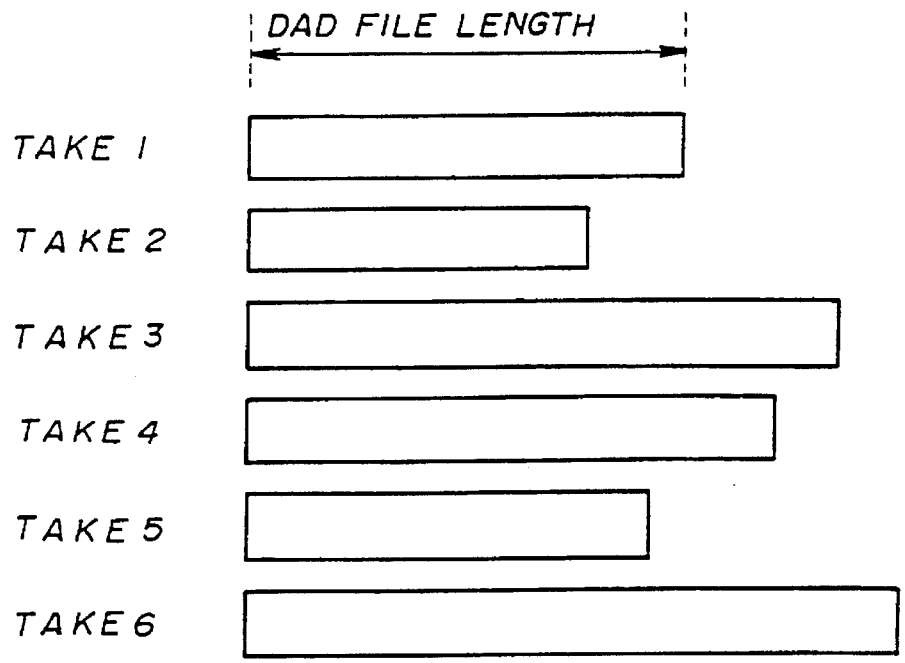
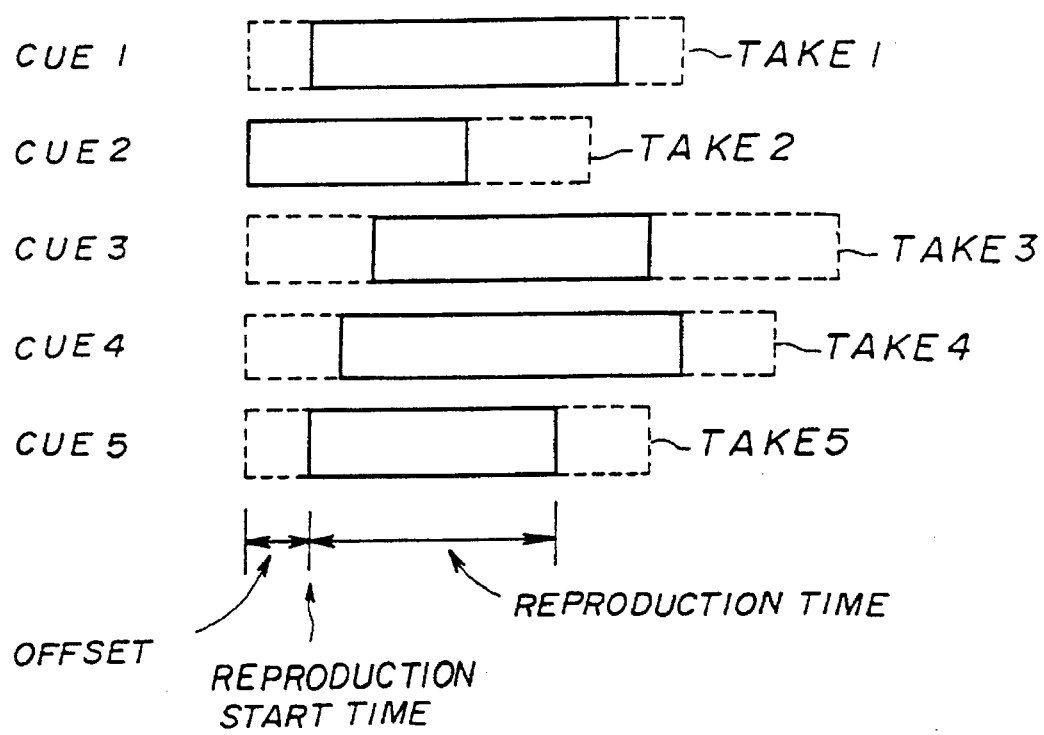

FIG. 12

CUE 1 ⟶ ASSEMBLE CUE SHEET 0 ⟷ ASSEMBLE SHEET 0

CUE 2 ⟶ ASSEMBLE CUE SHEET 1 ⟷ ASSEMBLE SHEET 1

CUE 3 ⟶ ASSEMBLE CUE SHEET 2 ⟷ ASSEMBLE SHEET 2

CUE 4 ⟶ ASSEMBLE CUE SHEET 3 ⟷ ASSEMBLE SHEET 3

CUE 5 ⟶ ASSEMBLE CUE SHEET 4 ⟷ ASSEMBLE SHEET 4

ECONOMICAL RECORDING AND REPRODUCING APPARATUS WHICH PERFORMS REAL-TIME PROCESSING OF DIGITAL AUDIO DATA

This application is a continuation, of application Ser. No. 08/192,973, filed Feb. 7, 1994 abandoned.

BACKGROUND OF THE INVENTION

The present invention relates to an audio signal recording and reproducing apparatus, and more particularly to an audio signal recording and reproducing apparatus using a hard disk as a data recording medium.

In the audio field, apparatuses which can handle audio signals as digital audio data have become widely used. As an apparatus which can freely edit digital audio data, there is an audio signal recording and reproducing apparatus which uses a hard disk to store the digital audio data.

Such an audio signal recording and reproducing apparatus comprises an A/D converter which converts analog signals into digital audio data, a D/A converter which converts digital audio data into analog signals, a digital signal processor (DSP) which processes the digital audio data, a hard disk on which the digital audio data is recorded, and a central processing unit (CPU) which controls the entire operation of the entire apparatus.

In the above-mentioned audio signal recording and reproducing apparatus, the digital audio data is treated as a file of data by processing the digital audio data in accordance with a control program having a typical disk operating system (DOS) function.

The digital audio data is recorded as a digital audio data (DAD) file in a predetermined area of the hard disk. A plurality of DAD files are recorded on the hard disk. Additionally, directory information and file allocation table (FAT) data are also recorded in predetermined areas of the hard disk, respectively.

The DAD file is recorded over a plurality of clusters formed on the hard disk. The directory information includes the file name of each DAD file and the first cluster number corresponding to the DAD file name. Additionally, FAT data includes chain data which indicates the recording order of the clusters of the hard disk which clusters constitute the DAD file.

In the audio signal recording and reproducing apparatus, when a recording operation for audio signals is performed, DAD file data, the directory information data, and the cluster chain data of the FAT, which data correspond to the recorded audio signals, are produced and recorded in the predetermined areas of the hard disk. Additionally, reproduction procedure file data is generated which is used when reproducing the recorded audio signals. The reproduction procedure file data includes the corresponding DAD file name, an offset data which indicates the offset from the head of the DAD file to the start position of the reproduction, and the length of data to be reproduced.

The reproduction of the recorded audio signals is subject to the following procedure under the control of the controlling unit in accordance with a control program having a DOS function. First, the DAD name, the offset and the data length to be reproduced are obtained from the reproduction procedure file. The first cluster number of the DAD file corresponding to the obtained DAD name is then read by referring to the directory information.

Digital audio data corresponding to the recorded audio signals is read out from a series of clusters consisting of the first cluster and the corresponding clusters indicated by the cluster chain data in the FAT.

The controlling unit sends to the DSP the digital audio data read out from the DAD file on the hard disk. The DSP performs a predetermined process on the digital audio data and sends the data to the D/A converter, and the D/A converter then convert the digital audio data into audio signals so as to reproduce the original audio signals.

The above-mentioned data processing method using a DOS function is simple and has an advantage in that the production of the software requires less labor and efforts. However, due to the fact that the processing speed of the typical DOS is low, there may be a problem in that the reproducing speed of the recorded audio signals is not sufficiently high for the audio signal recording and reproducing apparatus which requires fast data processing.

Particularly, in a case where the hard disk drive having a low data transfer rate or in the case where a CPU having a low processing speed is used for the controlling unit, there may be a problem in that the reproduced audio sound has interruptions. In order to eliminate those problems, a high speed hard disk or a high speed CPU is required for the conventional audio signal recording and reproducing apparatus, and accordingly there is a problem in that the audio signal recording and reproducing apparatus is expensive.

SUMMARY OF THE INVENTION

It is a general object of the present invention to provide an audio signal recording and reproducing apparatus in which the above-mentioned disadvantages are eliminated.

A more specific object of the present invention is to provide an audio signal recording and reproducing apparatus which can perform realtime processing with a structure having a low cost.

In order to achieve the above-mentioned objects, according to the present invention, there is provided an audio signal recording and reproducing apparatus which records input audio signals as digital audio data, and reproduces and outputs the input audio signals using the recorded digital audio data as output audio signals, the audio signal recording and reproducing apparatus comprising:

an input audio signal processing unit for converting the input audio signals into digital audio data;

a data file recording unit for recording the digital audio data, as digital audio data file information, on a recording medium, the recording medium having a plurality of clusters in which data having a predetermined number of bytes is recorded, the digital audio file information being recorded over a plurality of clusters;

a file management information recording unit for recording on the recording medium file management information which represents a reproducing order of the clusters in which the digital audio data file information is recorded;

a directory information recording unit for recording on the recording medium directory information which includes at least a number of the first cluster recorded first when the digital audio data is recorded;

a reproduction procedure file information recording unit for recording on the recording medium reproduction procedure file information which includes at least the number of the first cluster of a digital audio data file to be reproduced; and an output audio signal processing unit for converting digital audio data, which is read out from the recording medium in accordance with the reproduction procedure file information, into output audio signals being output from the audio signal recording and reproducing apparatus.

According to the present invention, when a reproducing operation is performed, the first cluster number to be reproduced can be directly obtained from the reproduction procedure file information. Therefore, the number of accesses to a file for obtaining the first cluster number, and thus the time spent on reading of the recorded digital audio data, can be reduced.

Other objects, features and advantages of the present invention will become more apparent from the following detailed description when read in conjunction with the accompanying information.

BRIEF DESCRIPTION OF THE DRAWINGS

FIG. 10 is an illustration showing an example of an assemble list;

FIG. 11 is an illustration for explaining a relationship between a take sheet and a cue sheet;

FIG. 12 is an illustration for explaining a relationship between a cue sheet, an assemble cue sheet and an assemble sheet;

DETAILED DESCRIPTION OF THE PREFERRED EMBODIMENTS

Figure 1:
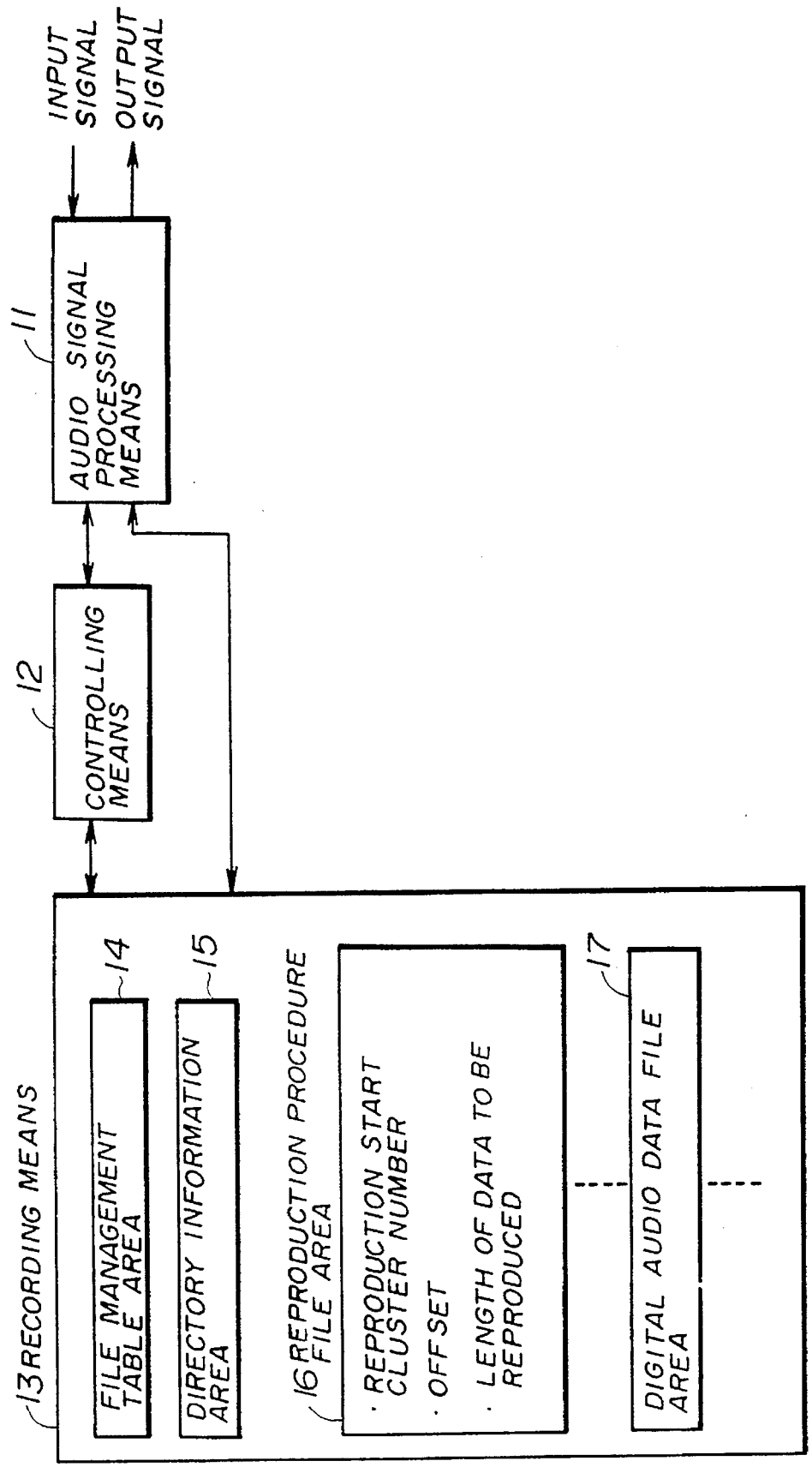
FIG. 1 is a block diagram showing a basic structure of an audio signal recording and reproducing apparatus according to the present invention.

A description will now be given, with reference to FIG. 1, of a basic structure of an audio signal recording and reproducing apparatus according to the present invention. In FIG. 1, audio signal processing means 11 converts input audio signals into digital audio data. Recording means 13 records, under control of controlling means 12, the digital audio data to a recording medium. The digital audio data read out from the recording medium under the control of the controlling means 12 is processed by the audio signal processing means 11, and then is output as output audio signals.

The recording medium of the recording means 13 comprises a digital audio data file area 17, a file management table area 14, a directory information area 15, and a reproduction procedure file area 16. The digital audio data file area 17 stores digital audio data in units of clusters each comprising a predetermined number of bytes. The file management table area 14 stores chain information which represents the recording order of the clusters of the digital audio data file. The directory information area 15 stores the cluster number of the first cluster of the digital audio data file. The reproduction procedure file area 16 stores the cluster number corresponding to the cluster to be reproduced first. The area 16 also stores an offset from the head of the first-reproduced cluster to a position from which the reproducing operation starts, and the data length of the data to be reproduced. The file management table data, the directory information data and the reproduction procedure file data are stored so as to correspond to the digital audio data file data stored in the digital audio data file area 17.

Figure 2:
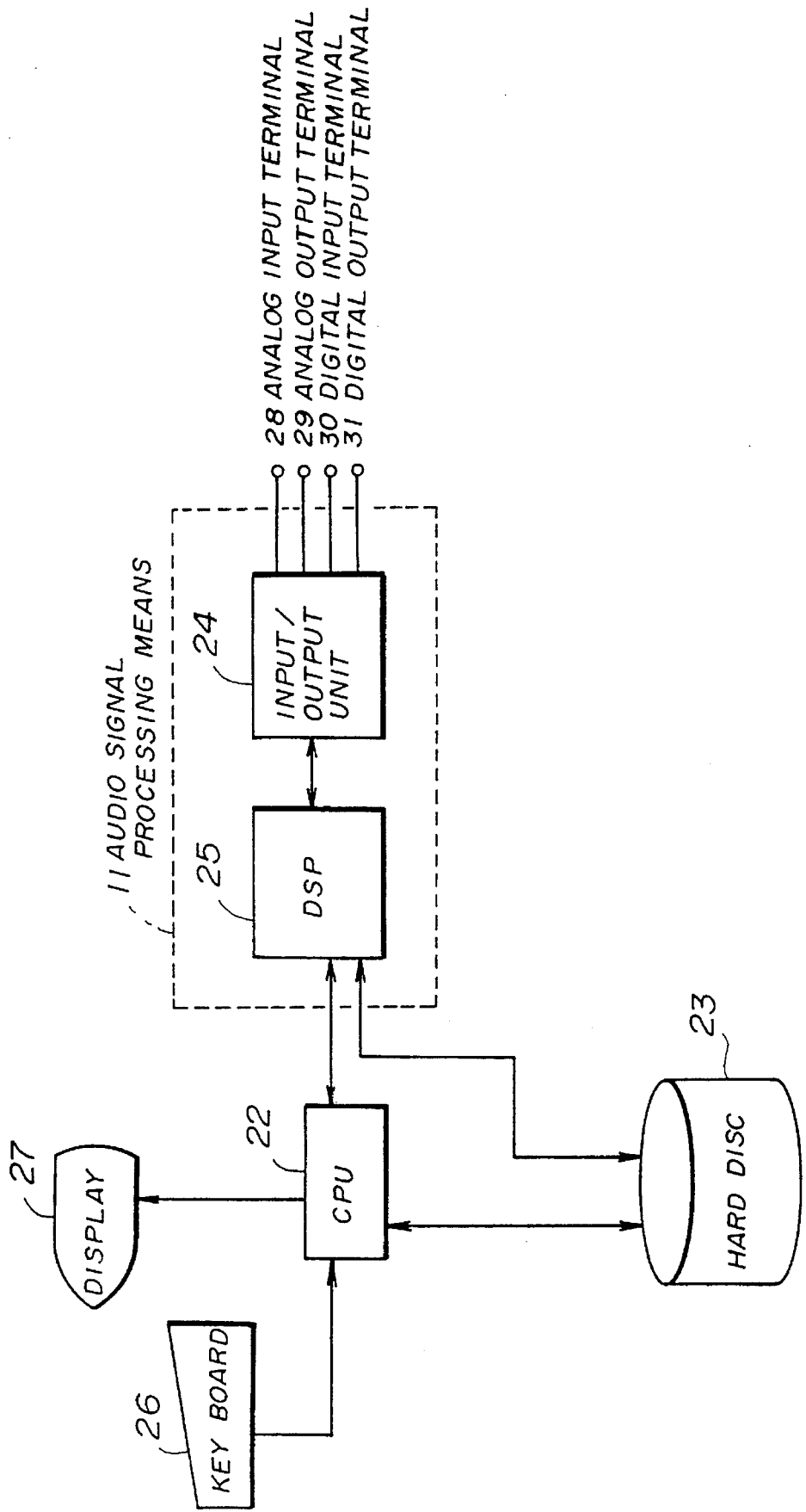
FIG. 2 is an illustration showing a structure of a first embodiment of an audio signal recording and reproducing apparatus according to the present invention.

FIG. 2 shows a structure of a first embodiment of an audio signal recording and reproducing apparatus according to the present invention. The audio signal recording and reproducing apparatus shown in FIG. 2 comprises: an input/output unit 24 and a digital signal processor (DSP) 25 which constitute audio signal processing means 11; a CPU 22 acting as the controlling means 12; and a hard disk acting as the recording medium of the recording means 13. The apparatus of the first embodiment also comprises a display unit 27 which displays the state of operation, and a keyboard 26 by which an operator can input operation commands such as a record command or a reproduce command.

The CPU 22 comprises a read only memory (ROM) and a random access memory (RAM), and performs various controlling operations in accordance with a system program installed in the audio signal recording and reproducing apparatus. The input/output unit 24 has an analog input terminal 28, an analog output terminal 29, a digital input terminal 30 and a digital output terminal 31.

A description will now be given of an outline of the recording and reproducing operations. In a case where the analog input terminal 28 and the analog output terminal 29 are selected when the recording operation is performed, an analog audio signal is supplied to the DSP 25 after being converted into digital data by an A/D converter provided in the input/output unit 24. When the digital input terminal 30 and the digital output terminal 31 are selected, a digital audio signal input to the digital input terminal 30 is directly supplied to the DSP 25.

The DSP 25 applies signal processing such as a level adjustment or a fade process to the digital audio data supplied by the input/output unit 24 in accordance with the command supplied by the CPU 22. The DSP 25 has a buffer memory in which the processed digital audio data is written.

The DSP 25 sends a signal to the CPU 22 when the buffer memory is full. The CPU 22, when receiving the signal indicating that the buffer memory is full, sends a direct memory access (DMA) transfer command so that the DMA transfer from the DSP 25 to the hard disk 23 is performed. After the buffer memory becomes empty, the DSP 25 resumes the processing of the input data and writing to the buffer memory. By means of the DMA transfer, The digital audio data is stored in a predetermined area of the hard disk.

When reproducing the audio signal, the CPU 22 sends the DMA transfer command so that the DMA transfer of the digital audio data is performed from the hard disk 23 to the DSP 25. The DMA transfer is performed in blocks of a predetermined sizes, and the digital audio data is written to the buffer memory in the DSP 25. The DSP 25 applies predetermined processing to the digital audio data written in the buffer memory, and sends the processed data to the input/output unit 25.

In a case where the analog input terminal 28 and the analog output terminal 29 are selected, the digital audio data supplied by the DSP 25 to the input/output unit 24 is output from the analog output terminal 29 after being converted into analog audio data by a D/A converter provided in the input/output unit 24. When the digital input terminal 30 and the digital output terminal 31 are selected, the digital audio signal supplied to the input/output unit 24 is directly output from the digital output terminal 31.

Figure 3:
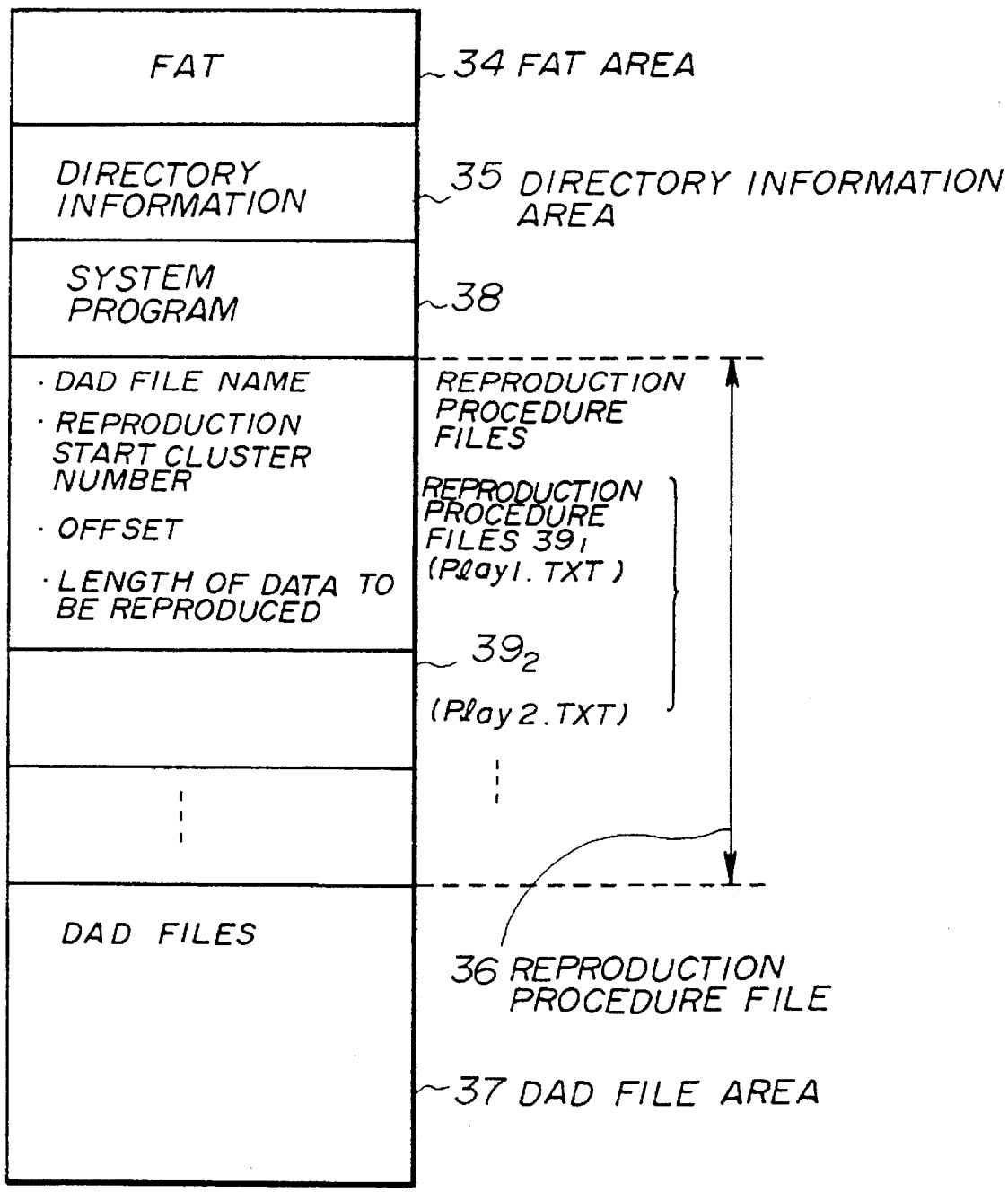
FIG. 3 is an illustration showing a file structure of the first embodiment.
Figure 4:
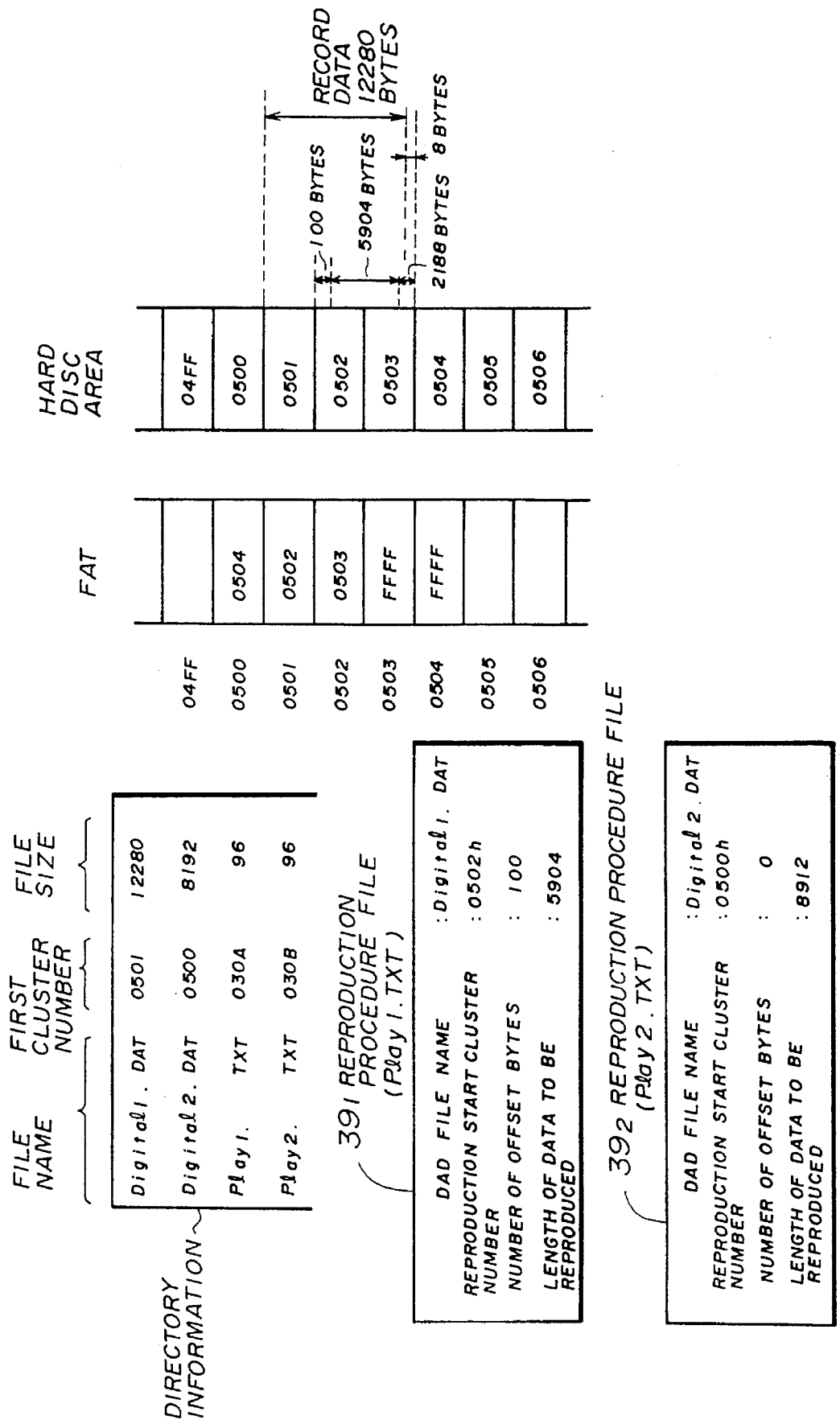
FIG. 4 is an illustration for explaining a file access of the first embodiment.

A description will now be given of a file structure of the first embodiment. FIG. 3 is an illustration for explaining the file structure of the first embodiment. FIG. 4 is an illustration for explaining a file access in the first embodiment. In the first embodiment of the audio signal recording and reproducing apparatus, the system program 38 is read and stored in the RAM provided in the CPU 22. The CPU 22 performs overall control of the apparatus in accordance with the system program 38. The system program 38 has the same function as an ordinary DOS, and handles the digital audio data as file data.

The digital audio data corresponding to input audio signals is stored as a DAD file in a DAD file area 37 of the hard disk 23. The DAD file area 37 can store a plurality of DAD files. Additionally, directory information used for reading/writing operations on the DAD file and management table data FAT are stored in a directory information area 35 and a FAT area 34, respectively.

A single DAD file comprises a plurality of clusters formed on the hard disk 23. The directory information includes the file name of each DAD file and the number of the first cluster and the file size of the DAD file corresponding to the DAD file name. The FAT includes cluster chain data which indicates the recording order of the clusters constituting the DAD file.

In the audio signal recording and reproducing apparatus, when the recording operation is performed, the DAD file, cluster chain data of the FAT and the directory information are produced. Reproduction procedure file 39 data is also produced and stored in a reproduction procedure file area 39. The reproduction procedure file 39 is produced for each of the DAD files.

The reproduction procedure file includes the file name of the corresponding DAD file, the number of the cluster from which the reproducing operation is started (hereinafter called reproduction start cluster), offset data which indicates the number of bytes between the head position and the start position of the reproducing operation in the first cluster, and the number of bytes representing the data length to be reproduced. The example described with reference to FIGS. 3 and 4 shows a case where two reproduction procedure files 39$_1$ and 39$_2$, that is "Play1.TXT" and "Play2.TXT", are produced.

FIG. 4 shows contents of each file where two DAD files, "Digital1.DAT" and "Digital2.DAT", are recorded on the hard disk 23.

The DAD file "Digital1.DAT" is stored in the clusters from 0501h to 0503h (the suffix h refers to hexadecimal representation). The DAD file "Digital2.DAT" is stored in the clusters 0500h and 0504h. The chain data for the clusters in the DAD files "Digital1.DAT" and "Digital2.DAT", is recorded in the FAT.

The reproduction procedure file "Play1.TXT" stores the corresponding DAD file name which is "Digital1.DAT", the reproduction start cluster number 0502h, the offset data which indicates the number of bytes between the head position and the start position of the reproducing operation in the first cluster, and the number of bytes representing the data length to be reproduced, Similarly, the reproduction procedure file "Play2.TXT" stores the corresponding DAD file name which is "Digital2.DAT", the reproduction start cluster number 0500h, the offset data which indicates the number of bytes between the head position and the start position of the reproducing operation in the first cluster, and the number of bytes representing the data length to be reproduced.

An editing operation, performed after the recording operation has been completed, may change the reproduction start cluster number, the number of offset bytes and the length of data to be reproduced.

It should be noted that, in FIG. 4, a single cluster has 4,096 bytes. Additionally, when editing after the recording is completed, the above-mentioned reproduction start cluster number is equal to the cluster number stored in the first position of the DAD file, and the number of offset bytes are 0 and the length of data to be reproduced is the same as the length of data which has been recorded.

Since the DAD file "Digital2.DAT" is not edited after its recording operation is completed, in the reproduction procedure file "Play2.TXT", the reproduction start cluster number is equal to the cluster number, 0500h which is the first cluster number of the DAD file; the number of offset bytes is 0; the length of data to be reproduced is the same as the length of data which has been recorded.

On the other hand, since the DAD file "Digital1.DAT" is edited after its recording operation is completed, in the reproduction procedure file "Play1.TXT", the reproduction start cluster number is changed from the cluster number, 0501h, which is the first cluster number of the DAD file to the next cluster 0502h. Additionally, the number of offset bytes is changed from 0 to 100, and the length of data to be reproduced is changed from 12,280 bytes, which is the same as the length of data which has been recorded, to 5,904 bytes.

The directory information includes DAD file name "Digital1.DAT", the number of the first cluster 0501h, and the file size. The directory information also includes DAD file name "Digital2.DAT", the number of the first cluster 0500h, and the file size.

Additionally, in order to perform a reading/writing operation on the reproduction procedure file, the directory information includes the reproduction procedure file name "Play1.TXT", its first cluster number and file size, and includes also the reproduction procedure file name "Play2.TXT", its first cluster number and file size.

The reading operation of the digital audio data from the hard disk 23, when reproducing audio signals, is performed by the following procedure in accordance with the system program under the control of the CPU 22.

First, the reproduction start cluster number, the number of offset bytes and the data length are obtained from the read reproduction procedure file. The digital audio data is then read out from the clusters indicated by the chain data, in turn, starting from the reproduction start cluster. The reading operation is performed by means of DMA transfer in accordance with the command sent from the CPU 22 to the hard disk 23 and the DSP 25.

As mentioned above, since the reproduction start cluster number can be directly obtained from the reproduction procedure file, it is not needed to refer to the directory information. Therefore, the number of file accesses performed to obtain the reproduction start cluster number of the DAD file to be reproduced can be reduced, and thus the file reading time can be reduced.

In the example of the reproduction procedure according to the reproduction file "Play1.TXT" of FIG. 4, the number, 0502h, of the first cluster of the DAD file "Digital1.DAT", the number of offset bytes 100, and the length of the data to be produced which is 5,904 bytes are obtained from the read out reproduction procedure file "Play1.TXT".

The reading operation for 5,904 bytes (digital audio data) is then started from the 101st byte of the reproduction start cluster 0502h by skipping 100 bytes from the first byte of the reproduction start cluster 0502h. The digital audio data is sequentially read out from the cluster 0502h and 0503h by referring to the cluster chain data of the FAT. The last cluster to be read is indicated by an end mark "FFFFh" in the FAT. The reading operation ends 2,180 bytes before the end of the cluster 0503h.

Similarly to "Play1.TXT", in the case of the reproduction procedure file "Play2.TXT", data comprising 8,192 bytes, all of which data corresponds to the recorded data, is read out using the entire contents of the clusters 0500h and 0504h.

Figure 5:
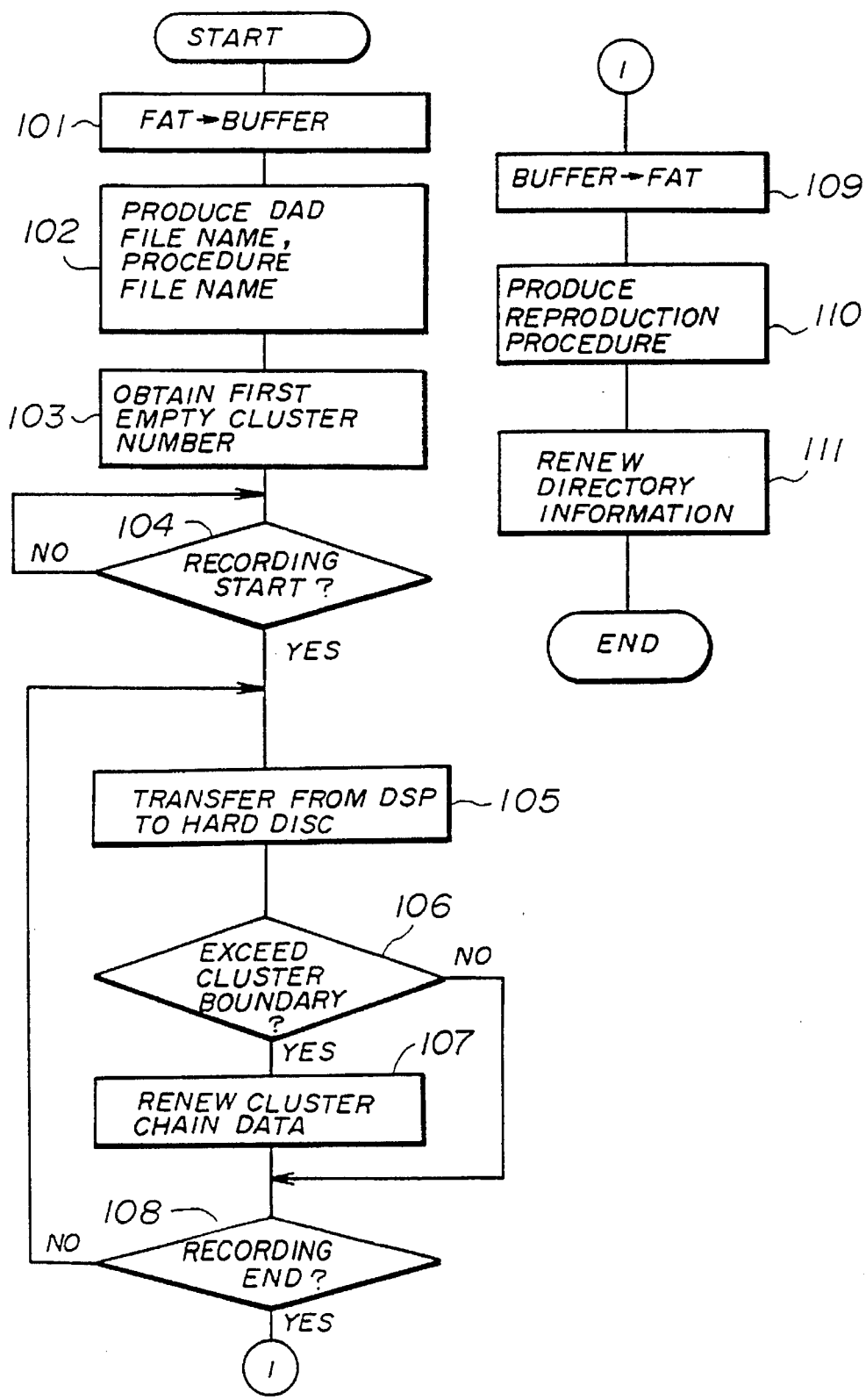
FIG. 5 is a flow chart of a recording operation procedure of the first embodiment.

A description will now be given of the details of the recording operation. FIG. 5 is a flow chart showing the recording operation procedure of the first embodiment according to the present invention. When a recording preparation command is input from the keyboard 26, cluster chain data is produced before the recording operation, in step 101, by copying the FAT 34 stored on the hard disk 23 to a buffer of the RAM provided in the CPU 22.

In step 102, the DAD file name and the reproduction procedure file name are produced. Those file names are input by an operator or automatically set to a predetermined file name by the apparatus. In order to record the DAD file "Digital1.DAT" shown in FIG. 4, the DAD name "Digital1.DAT" and the reproduction procedure file name "Play1.TXT" are given.

In step 103, the first empty cluster is found by referring to the cluster chain data obtained in step 101 so as to obtain the number of the first cluster to be recorded. The cluster number 0501h is obtained for the DAD file "Digital1.DAT".

In step 104, it is determined whether or not a recording start command is input from the keyboard 26. When the recording start command is input, the routine proceeds to step 105. The following steps from 105 to 108 are provided for recording the digital audio data supplied by the DSP 25 as a DAD file.

In step 105 one block of digital audio data is transferred from the DSP 25 to the hard disk 23 by means of DMA transfer in accordance with the command issued by the CPU 22. Thereby, one data block is written to the hard disk in an area following the previously recorded area. The size of the block corresponds to the capacity of the buffer in the DSP 25.

In step 106, it is determined whether or not the last writing position exceeds the boundary of the cluster being written. If the writing position does not exceed the boundary of the cluster, the routine proceeds to step 108 as updating of the cluster chain data is not needed. If the writing position exceeds the boundary of the cluster, the routine proceeds to step 107 where the cluster chain data in the buffer of the CPU 22 is updated.

In step 107, when data is written beyond the boundary between the cluster 0501h and the cluster 0502h, the cluster number 0502h is written at the address 0501h of the cluster chain data stored in the buffer of the CPU 22.

In step 108, it is determined whether or not a recording stop command is input from the keyboard 26. If it is determined that the recording stop command is not input, the routine returns to step 105 to continue the recording operation. If it is determined that the recording stop command is input, the end mark "FFFFh" is written at the last address in the cluster chain data, and the routine proceeds to step 109.

In step 109, the cluster chain data written in the buffer in the RAM of the CPU 22 is copied, as a FAT after the recording, to the FAT area 34 of the hard disk 23.

In step 110, the reproduction procedure file data is produced. In this step, the DAD file name and the first cluster number as the reproduction start cluster number are written in the reproduction procedure file, the name of which was produced in the previous step 102. Additionally, the number of offset bytes is set to 0, and the length of the data to be reproduced is set the same as that of the DAD file. That is, the DAD file name "Digital1.DAT", the reproduction start cluster number 0501h, the number of offset bytes 0, and the length of the data to be reproduced 12,280 are written in the reproduction procedure file "Play1.TXT".

In step 111, the directory information is updated so that the DAD file name, the first cluster number and the file size in bytes of the recorded DAD file, and the file name, the first cluster and the file size of the corresponding reproduction procedure file are written in the directly information area 35. That is, the DAD file name "Digital1.DAT" the first cluster number 0501h and the file size 12,280 are included in the directory information. The reproduction procedure file name "Play1.TXT", the first cluster number 030Ah and the file size 96 are also included in the directory information.

In an editing operation performed after the recording operation is completed, the contents of the reproduction procedure file corresponding to the recorded DAD file is displayed, for example as data arranged with respect to a time axis, on the display unit 27.

The operator inputs an editing command via the keyboard 26 so as to designate the part necessary for the reproduction in the original DAD file. That is, the operator sets the offset time for starting the reproduction and reproducing time from the start of the reproduction.

The CPU 22 determines, in accordance with the offset time and the reproducing time set by the operator, the reproduction start cluster number, the number of offset bytes from the head of the reproduction start cluster and the number of reproducing bytes, and records them to the corresponding reproduction procedure file. Accordingly, the reproduction start cluster number of the reproduction procedure file, the number of offset bytes and the number of reproducing bytes are changed from the values set at the time when the recording operation was completed.

Figure 6:
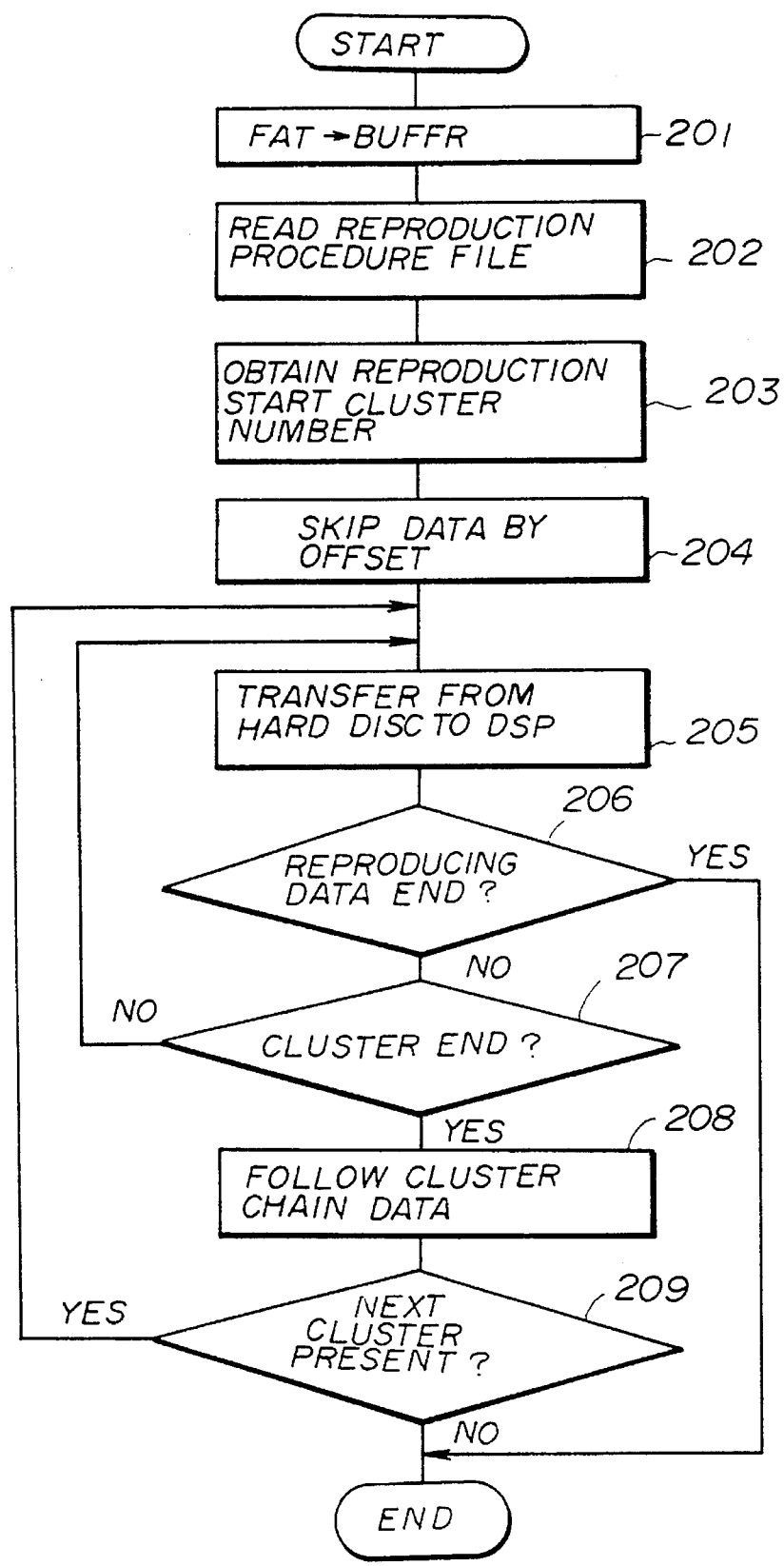
FIG. 6 is a flow chart of a reproducing operation procedure of the first embodiment.

A description will now be given of the details of the reproducing operation. FIG. 6 is a flow chart of the reproducing operation procedure of the first embodiment.

When a reproducing command is input via the keyboard 26, the FAT 34 recorded on the hard disk 23 is copied, in step 201, to the buffer of the RAM in the CPU 22 so as to refer to cluster chain data during the reproducing operation.

In step 202, the reproduction procedure file corresponding to the DAD file to be reproduced is read. In step 203, the reproduction start cluster number of the DAD file to be reproduced is obtained from the reproduction procedure file of step 202.

As mentioned above, it is not necessary to refer to the directory information so as to obtain the reproduction start cluster number. Accordingly, the number of file accesses to obtain the reproduction start cluster number can be reduced, and thus the reading time of the DAD file can be reduced.

In a case where the reproduction procedure file "Play1.TXT" has been changed by an editing operation as shown in FIG. 4 after the DAD file "Digital1.DAT" is recorded, the reproduction procedure file "Play1.TXT" is read so as to obtain the reproduction start cluster number 0502h, the number of offset bytes which is 100, and the length of the data to be reproduced which is 5,904 bytes.

In step 204, the reading start position is obtained by skipping the number of offset bytes from the head of the reproducing start cluster. That is, the starting byte of the reading operation is determined as 101st byte by skipping 100 bytes from the first byte of the reproduction start cluster 0502h.

The following steps from 205 to 209 are provided for reading the data of the required length from the reading start position, and reproducing the audio signals by supplying the data to the DSP 25. In step 205, one block of the digital audio data is read out from the hard disk 23, and the read data is supplied to the DSP 25 by means of DMA transfer. The block size corresponds to the capacity of the buffer of the DSP 25.

The DSP 25 applies predetermined signal processing to the read digital audio data, and supplies the processed data to the input/output unit 24. The input/output unit 24 reproduces the original audio signals, and outputs the signals from the output terminal.

The position following the last reading position is retained as a starting position for the reading operation of the next data block.

In step 206, it is determined whether or not all the data to be reproduced has been read out. If it is determined that all the data designated by the data length to be reproduced has been read out, the recording operation ends. If it is determined that not all the data to be reproduced has been read out, the routine proceeds to step 207. That is, in the case of the reproduction procedure file "Play1.TXT" shown in FIG. 4, it is determined that all data has been read out when 5,904 bytes have been read.

In step 207, it is determined whether or not the last reading position is the last position of the cluster currently being read. If it is determined that the last reading position is not the last position of the cluster currently being read, the routine returns to step 205 to continue reading of another data block. It should be noted that it is assumed that there is no block spanning two clusters.

If it is determined in step 207 that the last reading position is the last position of the cluster currently being read, the routine proceeds to step 208. In step 208, the first reading position of the cluster to be read next is obtained as a next reading position by following the cluster chain data stored in the buffer of the CPU 22.

In the case of the example of the reproduction procedure file "Play1.TXT" shown in FIG. 4, if the last reading position is the last position of the cluster 0502h, the cluster number 0503h which is to be read next is obtained from the contents at the address 0502h of the cluster chain data.

In step 209, it is determined whether or not a cluster to be reproduced remains by following the cluster chain data. If it is determined that there are no more clusters to be reproduced, the reproducing operation ends. If it is determined that there is still a cluster to be reproduced, the routine returns to step 205 to read the next data block.

As mentioned above, since the reproduction start cluster number is directly obtained from the reproduction procedure file, it is not necessary to refer to the directory information. Accordingly, the number of accesses to obtain the reproduction start cluster number of the DAD file to be reproduced can be reduced, and thus the reading time for the DAD file can be reduced. Therefore, a high speed CPU or high speed hard disk apparatus is not required, and suitable realtime processing is obtained by the construction of the apparatus having a reduced cost.

Figure 7:
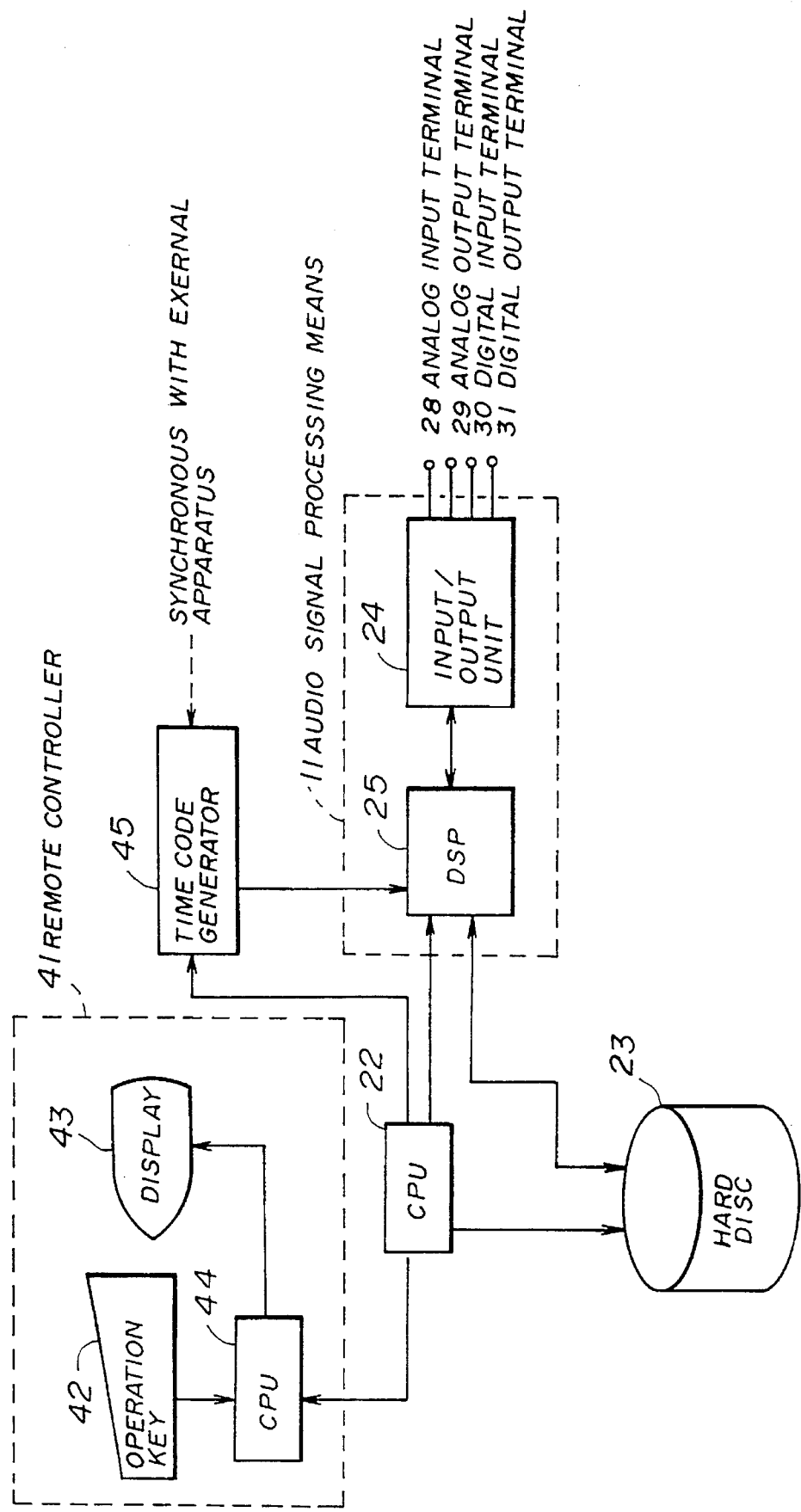
FIG. 7 is an illustration showing a structure of a second embodiment of an audio signal recording and reproducing apparatus according to the present invention.

A description will now be given of a second embodiment according to the present invention. FIG. 7 is an illustration of the structure of the second embodiment of an audio signal recording and reproducing apparatus according to the present invention. In FIG. 7, parts the same as the parts shown in FIG. 2 are given the same reference numerals, and descriptions thereof will be omitted. In the second embodiment, an operation key 42 and a display unit 43 are provided to a remote controller 41. Various operations such as record, reproduce, fast forward, rewind, stop or edit can be done through the operation key 42 of the remote controller 41. The operational state of the apparatus can be displayed on the display unit 43 of the remote controller 41. The remote controller 41 also comprises a CPU 44.

The CPU 44 of the remote controller 41 communicates with the CPU 22 through a serial port so as to send various commands input through the operation key 42 to the CPU 22, and to send display data supplied by the CPU 22 to the display unit 43.

Additionally, the second embodiment is provided with a time code generator 45 which adjusts reproduction start timing to synchronize with an external apparatus.

It should be noted that operations of the input/output unit 24 and the DSP 25 are the same as that of the first embodiment. The DMA transfer between the DSP 25 and the hard disk 23 is the same as that of the first embodiment.

Figure 8:
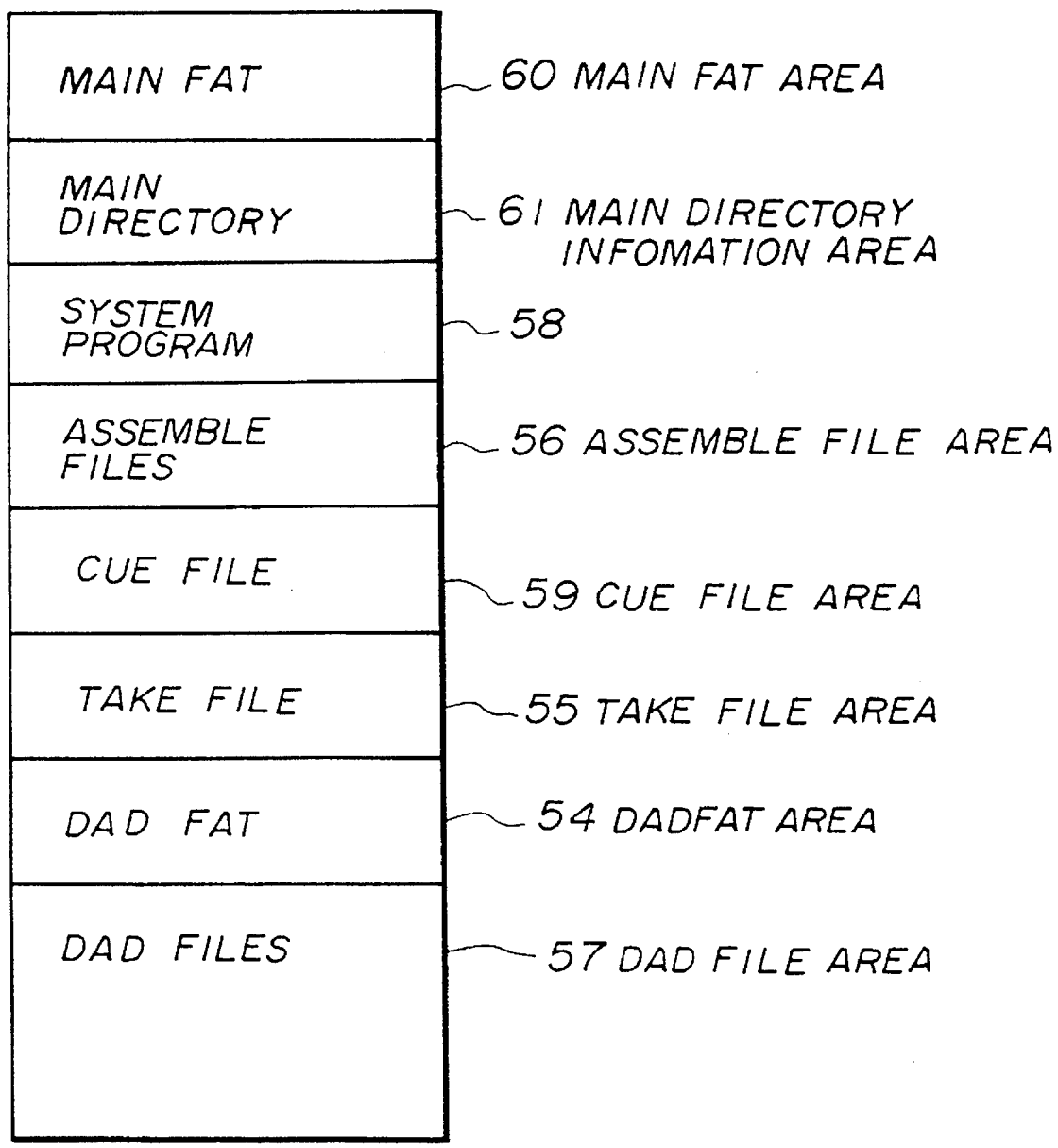
FIG. 8 is an illustration of a file structure of the second embodiment.

A description will now be given of a file structure of the second embodiment. FIG. 8 is an illustration for explaining a file structure of the second embodiment. In the second embodiment, a system program 58 stored on the hard disk 23 is read and supplied to the CPU 22, and the CPU 22 controls the entire apparatus. The system program 58 has a function equal to a general DOS function, and manages the digital audio data as file data.

The digital audio data corresponding to input audio signals is stored as a DAD file in a DAD file area 57 of the hard disk 23. The hard disk 23 is able to store a plurality of DAD files.

A take file which is directory information and used for the reading/writing operation of the DAD file is stored in a take file area 54 of the hard disk 23. DADFAT information which is a file management table is stored in a DADFAT area 54. Main directory information and main FAT information corresponding to files excluding DAD files and DADFAT information are stored in a main directory information area 61 and a main FAT area 60, respectively.

In the DAD file area 57, a plurality of sectors comprising a predetermined number of bytes are handled as a single cluster. On the other hand, in areas other than the DAD file area 57, a single sector is handled as a single cluster.

A single DAD file includes data stored over a plurality of clusters. Cluster chain data indicating the recording order of the clusters comprising a DAD file is included in the DADFAT.

The take file comprises a plurality of take sheet, each of which designates one of the DAD files. Hereinafter, the DAD file data, which is material obtained by recording, is called a take. The following information is recorded in each take sheet.

take name (which is the corresponding DAD file name)

the first cluster number and the last cluster number in the corresponding DAD file.

file size (the number of recording samples)

When a recording operation is performed in the audio signal recording and reproducing apparatus, a DAD file corresponding to the recorded audio signals is produced. The cluster chain data of the DADFAT is then updated in accordance with the produced DAD file, and the take sheet is produced.

Additionally, an assemble file which is a reproduction procedure file used for reproducing the recorded audio signals is produced and stored in an assemble file area 56 shown in FIG. 8. A single assemble file includes data for indicating a corresponding single audio sequence and the reproduction procedure data thereof. The assemble file corresponds to at least one DAD file. A plurality of assemble files are handled as an assemble file group.

In the assemble file, there are recorded the reproduction start cluster number, the number of offset bytes, and the number of bytes of data to be reproduced.

It should be noted that the assemble file may be automatically produced in accordance with the take sheet when the recording operation is performed, or may be optionally produced by an operator using a cue sheet described later.

Additionally, the second embodiment is provided with a cue file so as to allow free editing, which cue file is stored in a cue file area shown in FIG. 8. The cue file is an assembly of cue sheets produced in accordance with the respective take sheets. Hereinafter, a cue is data, which is necessary for reproduction, extracted from the corresponding take data.

The following information is recorded in the cue sheet.

cue name take name of the corresponding take reproduction start position in the corresponding take (an offset from the head of the take)

reproduction time (corresponding to the length of data to be reproduced)

It should be noted that the reproduction start position and the reproduction time are recorded using a time code which represents time.

The cue sheet may be automatically produced in accordance with the take sheet when the recording operation is performed, or may be optionally produced by an operator using the take sheet. The cue sheet is used as a component of the audio sequence during an editing operation.

While the take sheet corresponds to the DAD file on a one-to-one basis, a plurality of cue sheets can be provided to a single take sheet. When a standard recording operation is completed, a cue sheet is produced which is in one-to-one relationship with the take sheet. However, in a case where a plurality of cue sheet are produced for a single take sheet, the take sheet and the cue sheet are not always in one-to-one relationship.

Figure 9:
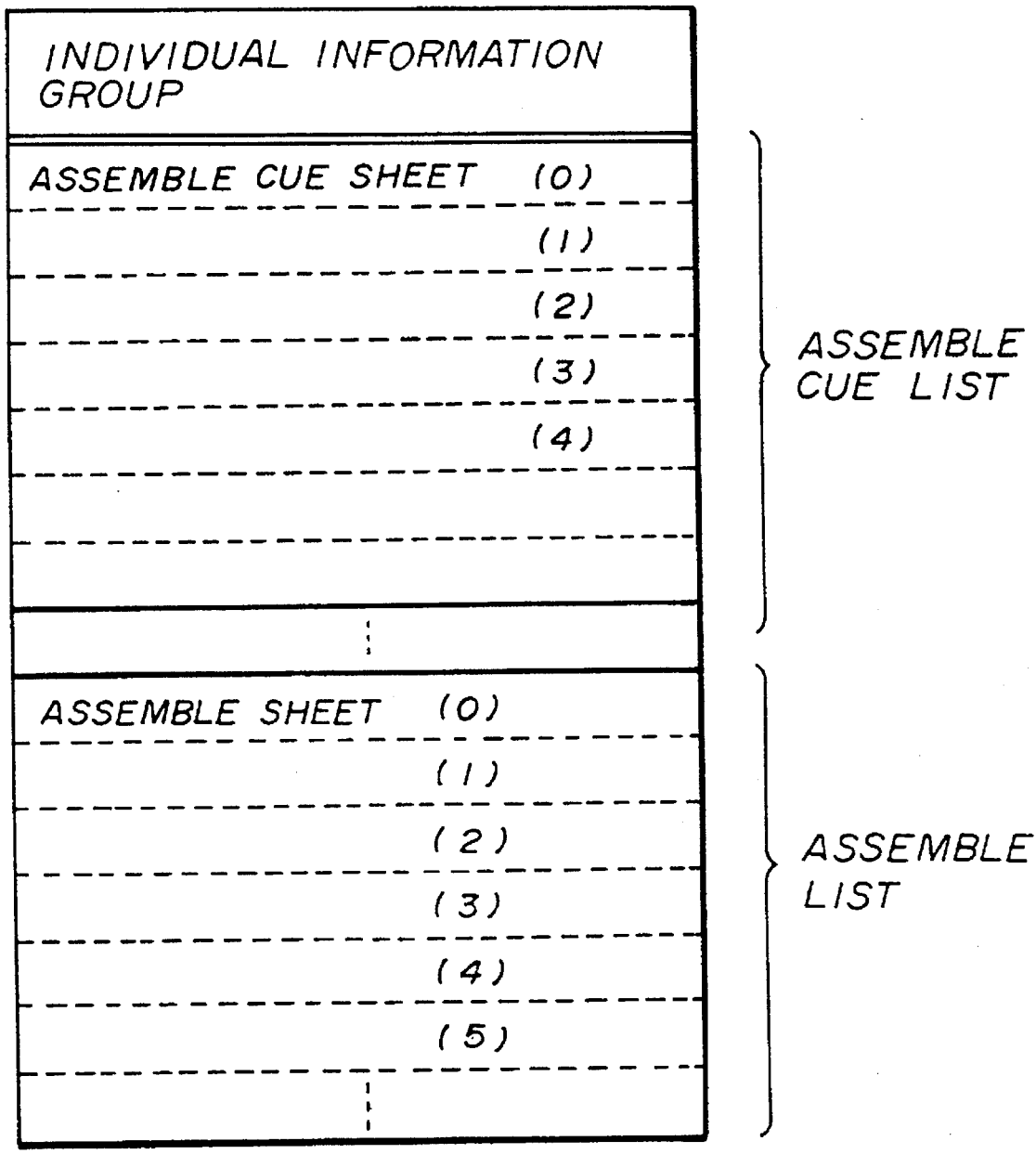
FIG. 9 is an illustration for explaining an assemble file.

FIG. 9 is an illustration for explaining the assemble file. Information indicating the reproduction procedure for an audio sequence is stored in the assemble file. The assemble file comprises, as shown in FIG. 9, an individual information group, an assemble cue list and an assemble list. The assemble cue list comprises at least one assemble cue sheet, and the assemble list comprises at least one assemble sheet.

A single assemble cue sheet is produced so as to correspond to a single cue sheet. One assemble cue sheet corresponds to one of the assemble sheets described later. The assemble cue sheet represents the reproduction start time and the length of the data corresponding to the take indicated by the cue sheet.

The following information is recorded in the assemble cue sheet.

corresponding cue name reproduction start position in the corresponding cue (an offset from the head of the cue)

reproduction time length start time at which the reproduction of the corresponding cue is started fader information track number on which the cue is arranged It should be noted that the reproduction start position, the reproduction time and the start time are recorded in accordance with a time code. Additionally, the present embodiment has a two-channel input terminal and a four-channel output terminal, and is provided with four conceptual tracks corresponding to the four channel outputs.

The data to be reproduced is arranged along a time axis on the track designated by the operator in accordance with the information of the assemble cue sheet. Accordingly, the track number is recorded on which the cue is positioned.

It should be noted that the assemble cue sheets are handled, starting from 0 for the first cue sheet.

The assemble sheets constituting the assemble list are produced on the basis of a one-to-one relationship. The following information is recorded in an assemble sheet.

corresponding cue sheet number reproduction start cluster number of the corresponding DAD file the number of the offset bytes in the reproduction start cluster of the corresponding DAD file length of the data to be reproduced (number of bytes)

reproduction start time

It should be noted that the reproduction start time is obtained by adding the offset time of the cue to the cue start time recorded in the assemble cue sheet, and accordingly the reproduction start time represents the actual start time of the reproduction in based on the data designated by the assemble sheet.

The assemble sheet has information substantially the same as the information of the corresponding assemble cue sheet. The assemble cue sheet is used for production and editing of the assemble sheet. On the other hand, the assemble sheet is referred to by the system program, during an actual reproducing operation, to obtain the reproduction start cluster number of the corresponding DAD file, the number of offset bytes and the number of bytes to be reproduced.

The reproduction start cluster number of the corresponding DAD file, the number of offset bytes, the number of bytes to be reproduced, and the reproduction start time are recorded in the assemble sheet after the recording operation is completed and the take sheet, the cue sheet and the assemble cue sheet are produced. The recording operation for the assemble sheet is performed by reading information referring to the assemble sheet, cue sheet and the take sheet, in that order. In the recording operation, the time code is converted into the number of bytes.

FIG. 10 is an illustration showing an example of the assemble list. As shown in FIGS. 9 and 10, each assemble sheet is numbered sequentially starting from 0 for the first assemble sheet. The assemble sheet represents a position of the data to be reproduced on the time axis of the track designated by the corresponding assemble cue sheet.

As shown in FIG. 10, in order to represent the actual reproducing order on each track, each assemble sheet stores the assemble sheet number used for the next reproduction. Additionally, assemble sheets 0 to 3 are fixed to the track numbers 1 to 4, respectively, in order to represent the first data to be reproduced for each track.

In the example shown in FIG. 10, reproduction for the track 1 is performed using assemble sheets in the order 0, 5, 8, 10. The assemble sheet provided with FFFFh, as an assemble sheet number, is the last assemble sheet. Similarly, the reproduction for the track 2 is performed using assemble sheet 1 followed by 6.

Additionally, each assemble sheet is stores the number of the previously reproduced assemble sheet. This number is used for editing of the assemble file.

A description will now be given, with reference to FIGS. 11 through 13, of the relationship between the DAD file, the take sheet, the cue sheet, the assemble cue sheet and the assemble sheet. FIG. 11 is an illustration for explaining the relationship between the take sheet and the cue sheet. In FIG. 11, there are shown six takes, TAKE1 to TAKE6, and five cues, CUE1 to CUE5. TAKE1 to TAKE6 are data of six DAD files. Each of CUE1 to CUE5 is taken from the respective one of TAKE1 to TAKE5.

In the figure, an area enclosed by a dotted line in CUE1 to CUE5 represents the corresponding take, and an area enclosed by a solid line indicates the cue. Each cue is set in accordance with the reproduction start position offset from the head position of the take and the reproduction time. A plurality of cues may be produced from a single take.

FIG. 12 is an illustration for explaining an example of the relationship between the assemble cue sheets and the assemble sheet in the same assemble file. The assemble cue sheets and the assemble sheets in the same assemble file correspond on a one-to-one basis. However, the assemble cue sheet number is not always equal to the corresponding assemble sheet number as it is in FIG. 12.

Each of the assemble cue sheets corresponds to the respective one of the cue sheets. In the example of FIG. 12, the assemble cue sheets 1 to 4 correspond to CUE1 to CUE4, respectively.

It should be noted that the cue sheets in the cue file can be referred to and used by all assemble files, and thus the cue sheet is regarded as a library of sound components. Accordingly a single cue sheet may corresponds to a plurality of assemble cue sheets. On the other hand, the assemble cue sheet in the assemble file is regarded as a sound component effective in the particular assemble file.

Figure 13:
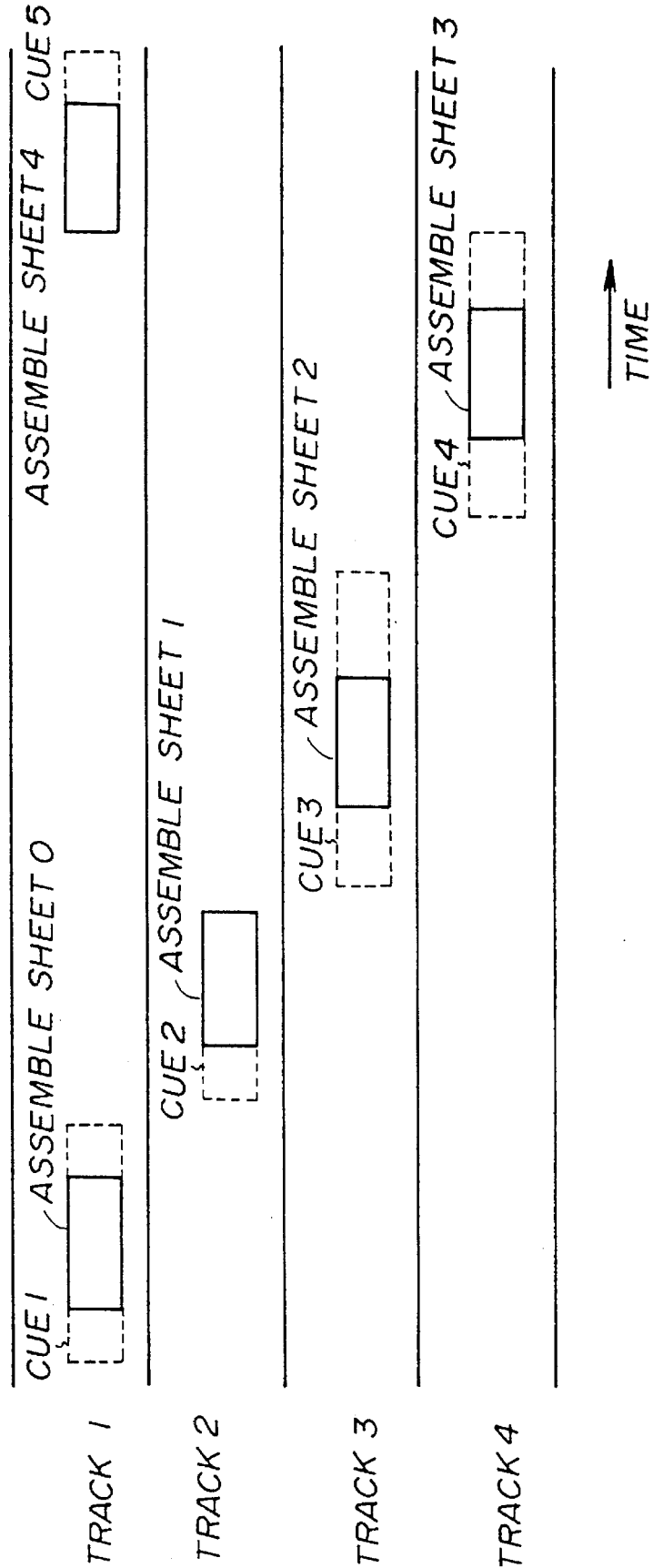
FIG. 13 is an illustration showing the position of each assemble sheet and a corresponding track.

FIG. 13 is an illustration for explaining a relationship between the assemble sheets in an assemble file and each track. FIG. 13 shows a state where the data to be reproduced is positioned along a time axis of each track in accordance with the relationship shown in FIG. 12.

As previously mentioned, the assemble cue sheet designates the offset and the reproduction time length within the corresponding cue, the reproduction start time of the cue, the start time at which the reproduction of the corresponding cue is started, and the track number on which the cue is arranged. Additionally, the assemble cue sheet represents the arrangement on the time axis of the data to be reproduced. The assemble sheet has the same information as that of the corresponding assemble cue sheet.

Accordingly, in FIG. 13, the position of the data to be reproduced is indicated by the assemble sheet. In FIG. 13, a solid line indicates the assemble sheet and dotted line indicates the cue corresponding to the assemble sheet.

As mentioned with reference to FIG. 10, the assemble file includes information about the recording order of a plurality of assemble sheets which constitute the assemble file. In the example shown in FIG. 13, in track 1, DAD file data is read out and reproduced in the order of assemble sheets 0, 4. In the tracks 2 to 4, DAD files are read out and reproduced in accordance with the assemble sheets 1 to 3, respectively.

The arrangement of the data to be reproduced on the time axis of each track, which arrangement is determined by the assemble sheets of the assemble file as shown in FIG. 13, is hereinafter called, the assemble, corresponding to the assemble file.

Figure 14:
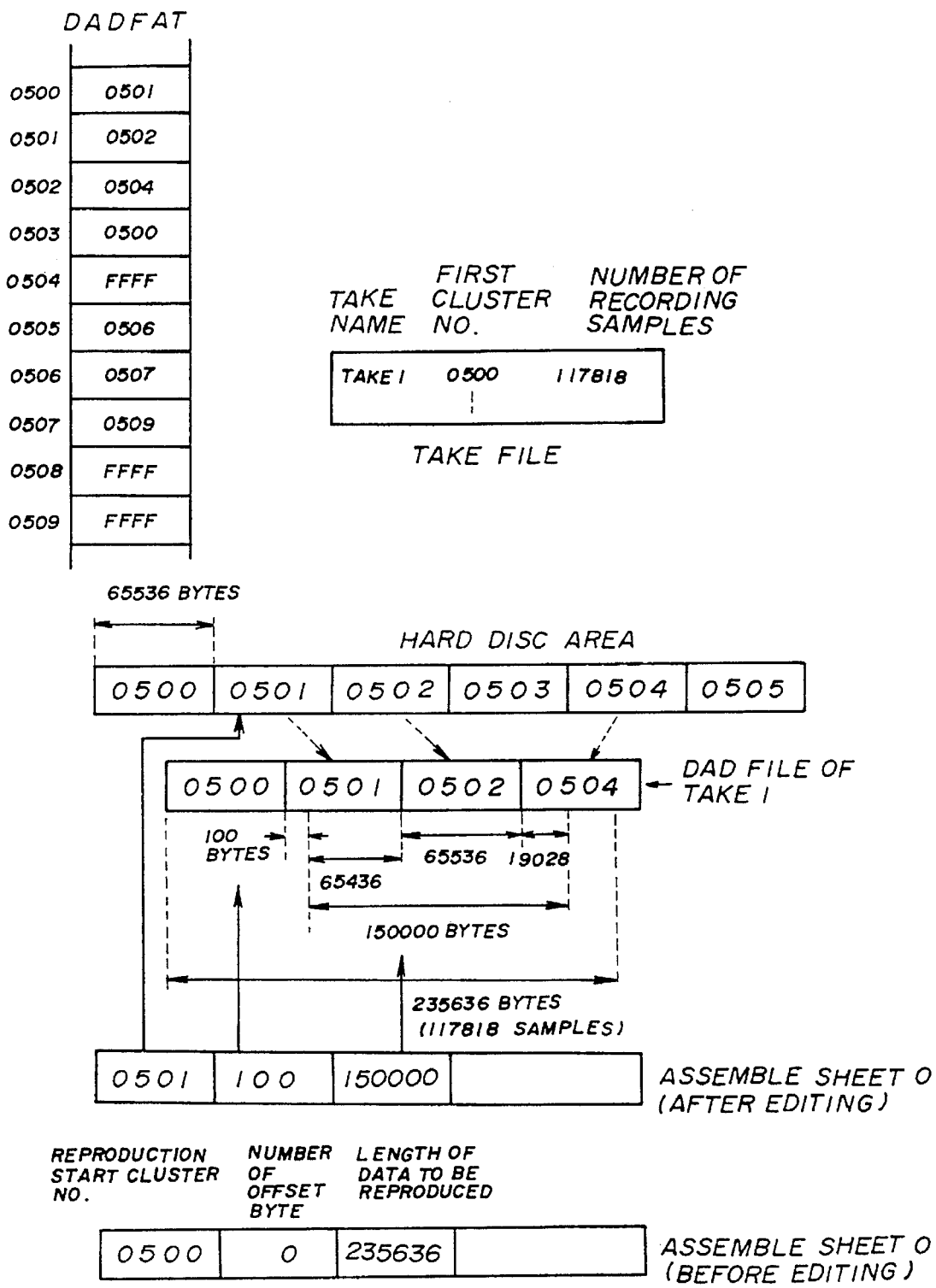
FIG. 14 is an illustration for explaining a file access of the second embodiment.

FIG. 14 is an illustration for explaining a file access of the second embodiment. In FIG. 14, the state of each file is shown when the DAD file corresponding to TAKE1 is recorded on the hard disk 23.

The DAD file of TAKE1 is recorded on clusters 0500h, 0501h, 0502h and 0504h. Cluster chain information for constituting the DAD file of TAKE1 is included in the DADFAT.

In the assemble sheet 0, associated with the TAKE1 in the assemble file, the reproduction start cluster number, the number of offset bytes between the head of the DAD file and the reproduction start position and the length of the data to be reproduced (number of bytes) are recorded. In the example of FIG. 14, a single cluster comprises 64K(65,536) bytes.

Before an editing operation is performed after the recording is completed, the above-mentioned reproduction start cluster number is equal to the first cluster number in the DAD file; the number of offset bytes is 0; the length of the data to be reproduced is equal to the length of the data recorded.

By performing an editing operation such as designating a part necessary for the reproduction from the original DAD file after the recording is completed, the reproduction start cluster number of the assemble sheet, the number of offset bytes and the length of the data to be reproduced are changed.

In the assemble sheet 0 before editing, the reproduction start cluster number is the same as the first cluster number; the number of offset bytes is 0; the length of the data to be produced is 235,356 bytes which is the same as that of the recorded data.

In the assemble sheet after editing, the reproduction start cluster number has been changed from 0500h to 0501h since the editing operation was performed after the recording was completed. Additionally, the number of offset bytes is changed from 0 to 100, and the length of data to be reproduced is changed from 235,636 to 150,000 bytes.

In the take file, which is directory information of the DAD file recorded on the hard disk 23, the take name TAKE1, the first cluster number 0500h and the number of recording samples, 117,818, are recorded. A single sample comprises 2 bytes.

Reading of the digital audio data from the hard disk 23, when the recorded audio signal is reproduced, is performed in the following procedure under control of the CPU 22 in accordance with a system program.

First, the reproduction start cluster number, the number of offset bytes and the data length are obtained from the read out assemble sheet. The digital audio data is then read out from the clusters indicated by the cluster chain data of the DADFAT starting from the reproduction start cluster. The reading operation is performed by means of DMA transfer in accordance with the command sent from the CPU 22 to the hard disk 23 and the DSP 25.

As mentioned above, since the reproduction start cluster number can be directly obtained from the assemble sheet, it is not necessary to refer to the directory information. Therefore, the number of file accesses performed to obtain the reproduction start cluster number of the DAD file to be reproduced can be reduced, and thus the file reading time can be reduced.

In the example of the reproduction procedure in accordance with the assemble sheet 0 shown in FIG. 14, the reproduction start cluster number 0501h of TAKE1, the number of offset bytes 100, and the length of the data to be produced which is 150,000 bytes are obtained from the read out assemble sheet 0.

The reading operation for 150,000 bytes (digital audio data) is then started from the 101st byte of the reproduction start cluster 0501h by skipping 100 bytes from the first byte of the reproduction start cluster 0501h. The digital audio data is, in turn, read out from the cluster 0501h, 0502h and 0504h by referring to the cluster chain data of the DADFAT. The last cluster to be read is indicated by an end mark "FFFFh" in the DADFAT. The reading operation ends when the remaining data in the cluster 0504h is 20,000 bytes.

A description will now be given of the detail of the recording operation. Recording can be performed by selecting a mode, in accordance with a command input by an operator, from among an assemble file editing mode, a cue file editing mode and a take file editing mode.

In a recording operation in the assemble file editing mode, a DAD file obtained by the recording, DADFAT data, a take sheet, a cue sheet, an assemble cue sheet and an assemble sheet are produced when the recording is completed. At this time when editing operation is not performed, the offset of the cue with respect to the take and the offset of the assemble cue with respect to the cue are both 0. Additionally, the data lengths of the cue and the assemble cue are the same as that of the data length of the take, that is, the data length of the DAD file obtained by the recording.

In a recording operation in the cue file editing mode, a DAD file obtained by the recording, DADFAT data, a take sheet, a cue sheet are produced when the recording is completed. At this time, an offset of cue with respect take is 0. Additionally, the data lengths of cue is the same as that of the data length of take, that is, the data length of the DAD file obtained by the recording.

In a recording operation in the take file editing mode, a DAD file obtained by the recording, DADFAT data and a take sheet are produced when the recording is completed.

Figure 15:
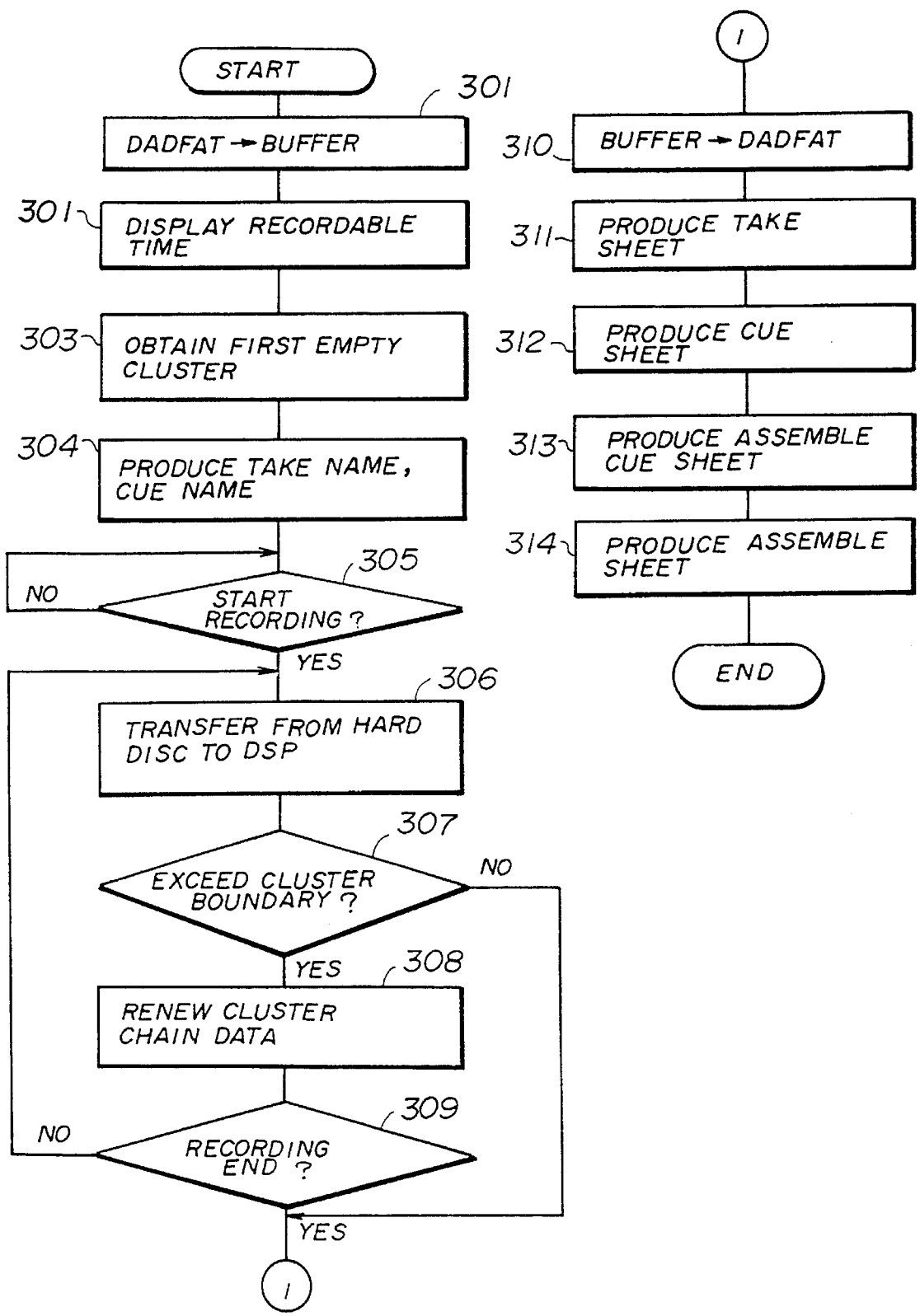
FIG. 15 is a flow chart of a recording operation procedure of the second embodiment.

FIG. 15 is a flow chart showing the recording operation procedure of the second embodiment according to the present invention. The recording operation will be described with respect to the assemble file mode with an example in which the DAD file of TAKE1 is recorded. When a recording preparation command is input from the operation key 42 of the remote controller 41, cluster chain data before the recording operation is produced, in step 301, by copying the DADFAT stored in the hard disk 23 to a buffer of the RAM provided in the CPU 22.

In step 302, the available space of the DAD file is checked, and recordable time is displayed on the display unit 43 of the remote controller 41. In step 303, the first empty cluster is found by referring to the cluster chain data obtained in step 301 so as to obtain the number of the first cluster to be recorded. The cluster number 0500h is obtained for the DAD file of TAKE1.

In step 304, a take name and a cue name are produced. Those names are input by an operator or automatically set to predetermined file names by the apparatus. In order to record the DAD file of TAKE1 shown in FIG. 14, the take name TAKE1 is given.

In step 305, it is determined whether or not a recording start command is input from the operation key 42. When the recording start command is input, the routine proceeds to step 306. The following steps from 306 to 309 are provided for recording the digital audio data supplied by the DSP 25 as a DAD file.

In step 306 one block of digital audio data is transferred from the DSP 25 to the hard disk 23 by means of DMA transfer in accordance with the command sent from the CPU 22. Thereby, one data block is written to the hard disk in an area following the previously recorded area. The size of the block corresponds to the capacity of the buffer in the DSP 25.

In step 307, it is determined whether or not the last writing position exceeds the boundary of the cluster being written. If the writing position does not exceed the boundary of the cluster, the routine proceeds to step 309 as updating of the cluster chain data is not needed. If the writing position exceeds the boundary of the cluster, the routine proceeds to step 308 where the cluster chain data in the buffer of the CPU 22 is updated.

When data is written beyond the boundary between the cluster 0500h and the cluster 0501h, the cluster number 0501h is written at the address 0500h of the cluster chain data stored in the buffer of the CPU 22.

In step 309, it is determined whether or not a recording stop command is input from the operation key 42. If it is determined that the recording stop command is not input, the routine returns to step 306 to continue the recording operation. If it is determined that the recording stop command is input, the end mark "FFFFh" is written at the last address in the cluster chain data, and the routine proceeds to step 310.

In step 310, the cluster chain data written in the buffer in the RAM of the CPU 22 is copied as DADFAT information, after the recording, to the DADFAT area 54 of the hard disk 23.

In step 311, the take sheet corresponding to the recorded DAD file is produced. In this step, the take name, the first cluster number and the last cluster number of the DAD file, and the file size of the DAD file (number of recording samples) are recorded.

In step 312, a cue sheet corresponding to the take sheet produced in step 311 is produced. That is, the cue name, the corresponding take name, the reproduction start position in the corresponding take (an offset from the head of the take) and the reproduction time (length of data to be reproduced) are recorded in the cue sheet. Additionally, the number of offset bytes is set to 0, and the reproduction time of the cue is set the same as that of the take.

In step 313, an assemble cue sheet is produced corresponding to the cue sheet produced in the step 312. That is, the corresponding cue sheet name, the reproduction start position in the corresponding cue (an offset from the head of the cue), the reproduction time, the reproduction start time of the corresponding cue, the fader information and the track number on which the cue is arranged are recorded in the assemble cue sheet. At this time, the number of the offset byes is set to 0, and the reproduction time is set equal to that of the cue. The reproduction start time of the cue is designated by the operator.

In step 314, an assemble sheet is produced corresponding to the assemble cue sheet produced in the step 313. That is, the corresponding assemble cue sheet name, the reproduction start cluster number of the DAD file of the corresponding take, the number of the offset bytes between the head of the reproduction start cluster and the reproduction start position, the length of the data to be reproduced (number of bytes), and the reproduction start time are recorded in the assemble sheet. At this time, the reproduction start cluster number is set equal to the first cluster number of the DAD file; the number of the offset byes is set to 0; and the reproduction time is set equal to that of the DAD file. The reproduction start time of the cue is equal to the reproduction start time which is designated by the operator.

In the recording operation performed with respect to the DAD file of TAKE1, the first cluster number 0501h as the reproduction start cluster number, the number of offset bytes which is 0 and the length of data to be reproduced which is 235,636 are recorded in the assemble sheet 0 of the assemble file.

In a recording operation performed in assemble file editing mode, the take sheet, the cue sheet and the assemble cue sheet corresponds in one-to-one relationship. However, this one-to-one relationship is not always established when the assemble cue sheet is edited by an editing operation performed after the recording.

In an editing operation (described below) performed after the recording operation is completed, the data designated by the assemble sheet is displayed, for example, as data arranged with respect to a time axis, on the display unit 43 of the remote controller 41.

The operator inputs an editing command via the operation key 42 so as to designate the part in the original DAD file necessary for the reproduction. That is, the operator sets the offset time for starting the reproduction and reproducing time from the start of the reproduction.

The CPU 22 updates the assemble cue sheet in accordance with the offset time and the reproducing time set by the operator, and determines the reproduction start cluster number, the number of the offset bytes from the head of the reproduction start cluster and the number of the reproducing bytes, and records them in the corresponding assemble sheet. Accordingly, the reproduction start cluster number of the assemble sheet, the number of offset bytes and the number of reproducing bytes are changed from the values set at the time when the recording operation was completed.

Figure 16:
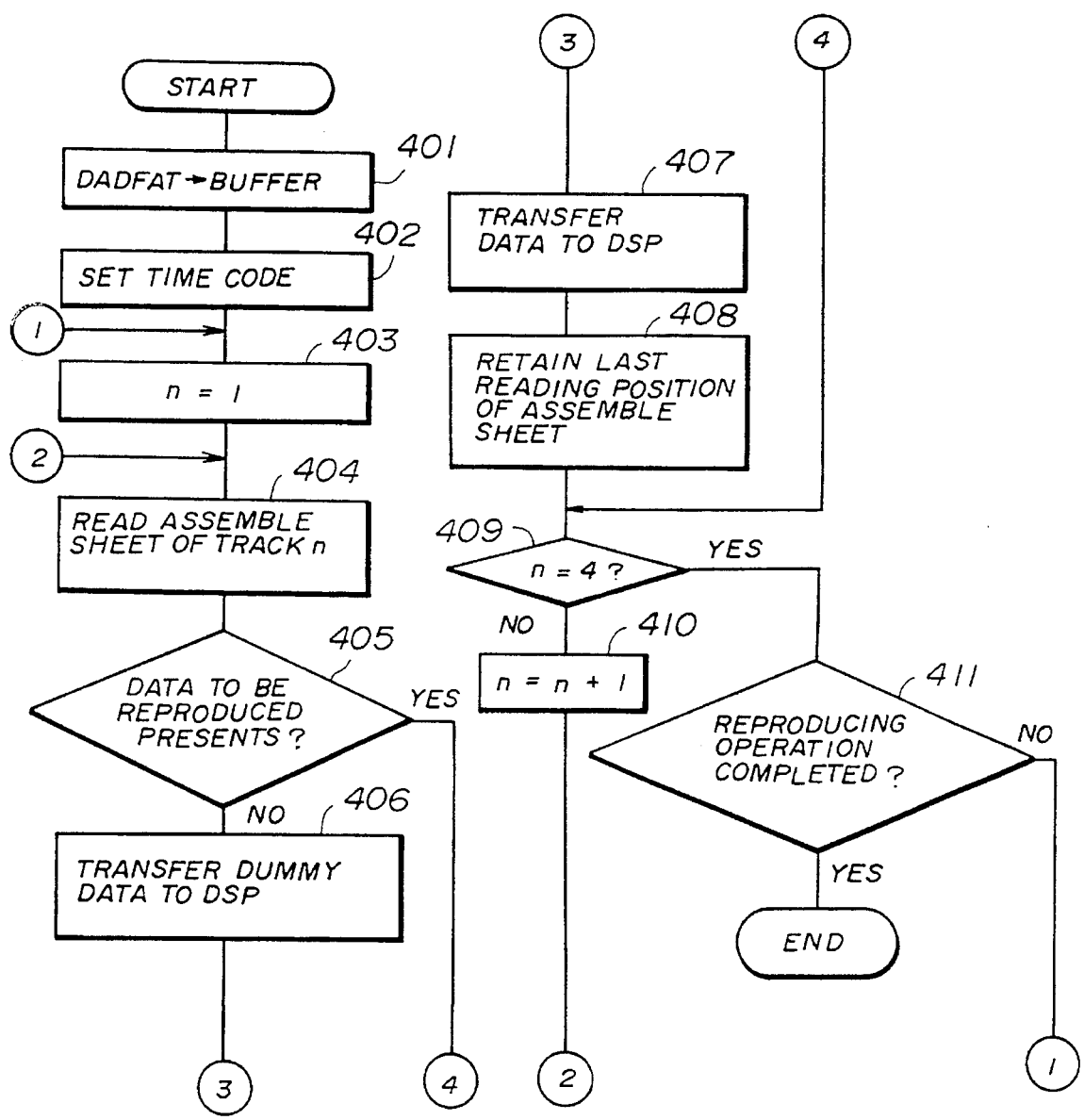
FIG. 16 is a flow chart of a reproducing operation procedure of the second embodiment.

A description will now be given of a reproducing operation of the second embodiment. FIG. 16 is a flow chart of a reproducing operation procedure of the second embodiment. FIG. 1 is an illustration for explaining a reproducing operation procedure of four tracks.

Figure 17:
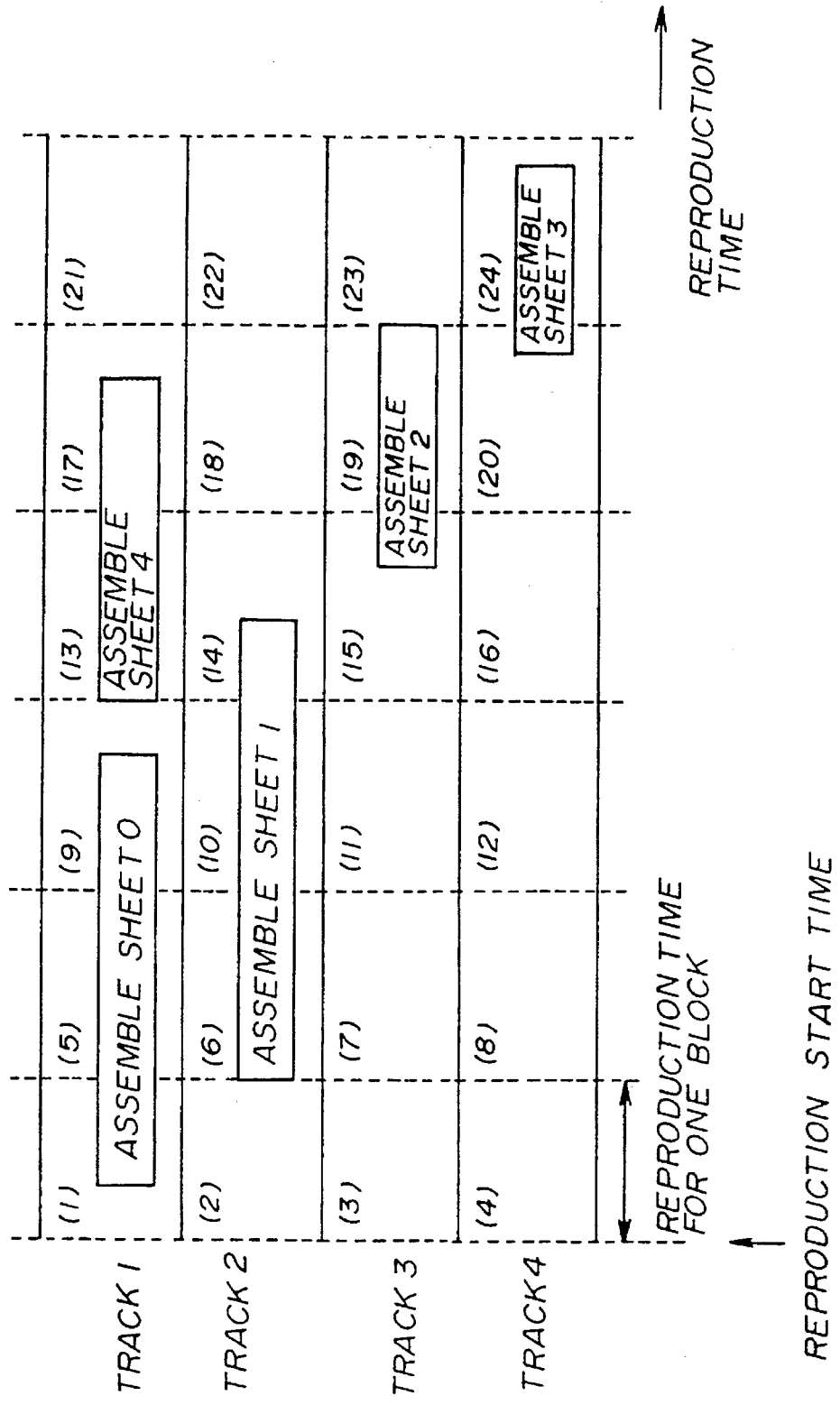
FIG. 17 is an illustration for explaining the reproducing order of four tracks.

In the reproducing operation, the CPU 22 sends a command to the hard disk 23 and the DSP 25 so that block data corresponding to the capacity of the buffer of the DSP is sent from the hard disk to the DSP 25 by means of DMA transfer. FIG. 17 shows the arrangement of the data to be reproduced on tracks 1 to 4. The data indicated by the respective assemble sheet is read out and reproduced at an area indicated by a solid line on each track.

In the example shown in FIG. 17, in track 1, the data corresponding to the assemble sheets 0 and 4 are, in turn, read out and reproduced. In tracks 2 to 4, the data corresponding to the respective assemble sheets 1 to 3 are read out and reproduced. In the figure, the interval between adjacent dotted lines represents the reproduction time corresponding to a single block of data. Transfer of the data from the hard disk 23 to the DSP 25 during the reproducing operation is performed block by block in the track order, 1, 2, 3, 4, 1, 2 . . . . That is, in FIG. 17, the block data is transferred in ascending order starting from block (1) to block (24). It should be noted that null data produced by the CPU 22 is provided for portions having no data designated by an assemble sheet, and the null data is transferred to the DSP 25.

When a reproduction start command is input through the operation key 42 of the remote controller 41, first, in step 401, cluster chain data referred during reproducing operation is obtained by copying the DADFAT on the hard disk 23 to the buffer of the RAM in the CPU 25. In step 402, a time code is set in the time code generator 45. The time code generator 45 provides a timing signal for starting a reproducing operation to the DSP 25 in synchronous with external apparatuses.

In the following steps from 403 to 412, a reproducing operation of the data on the four tracks is performed by sequentially reading the assemble sheets.

In step 403, a track from which a data block to be read is set to track 1, and a counter n is set to 1. In step 404, the assemble sheet which designates the data on the track n is read out, and the reproduction start cluster number, the number of the offset bytes, and the number of bytes of data to be reproduced from the corresponding DAD file are obtained. It should be noted that it id not necessary to perform this process when the reproducing operation is performed on the data of the assemble sheet which has been read out.

As mentioned above, since the reproduction start cluster number can be obtained directly from the assemble sheet, the take file which serves as directory information does not need to be referred to. Accordingly, the number of file accesses for obtaining the reproduction start cluster number can be reduced as compared to conventional apparatuses, and thus the reading time for the DAD file can be reduced.

In step 405, it is determined whether or not data designated by the assemble sheet is present, which data corresponds to the currently block. If data to be reproduced is not present, null (dummy) data produced by the CPU 22 is transferred to the DSP 25. If there is data to be reproduced, the routine proceeds to step 409.

In step 407, the data for one block is sent from the current reading position of the DAD file to the DSP 25 by means of DMA transfer. It should be noted that a portion of a block where there is no data is provided with null data produced by the CPU 22, and the null data is transferred to the DSP 25 together with the data designated by the assemble sheet. The DSP 25 applies a predetermined process to the read out digital audio data, and supplies the processed data to the input/output unit 24. The input/output unit 24 reproduces the original audio signal, and outputs the signal via the output terminal.

In step 408, the last reading position of the DAD file corresponding to the assemble sheet is retained. The reading operation for the next block on the same track is started at a position next to the retained last reading position. It should be noted that if the last reading position corresponds to the last position of the cluster, the first position of the cluster obtained by following the cluster chain data in the buffer of the CPU 22 is retained as a start position of the next reading operation.

In step 409, it is determined whether or not the counter n is equal to 4. If n is not equal to 4, which condition represents that there is another track to be read at the same reproduction timing, n is incremented, and the routine returns to step 404 to read for another track.

If it is determined, in step 409, that n is equal to 4, the routine proceeds to step 411 where it is determined whether or not all data to be reproduced has been read out. If it is determined that all data to be reproduced has been read, the reproducing operation ends. If there still remains data to be reproduced, the routine returns to step 403 to resume the reading operation from track 1.

A description will now be given of the editing operation of the second embodiment. The editing operation is started by inputting the necessary command and information through the remote controller 41 by the operator. When an editing operation is performed, the state of various files can be displayed on the display 43. The CPU 22 performs the necessary process in accordance with the command and information sent by the remote controller 41, and sends back information necessary for displaying to the remote controller 41.

The editing operation is classified into two kinds; one is for editing the DAD file itself (edit of a take file); the other is for editing pointer information corresponding to the DAD file (edit of a cue file and of an assemble file).

Figure 18:
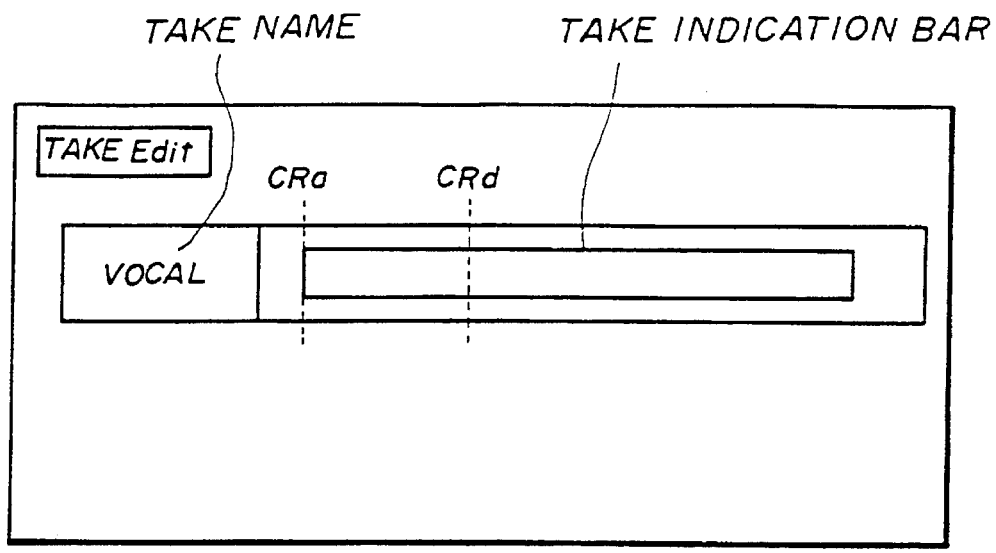
FIG. 18 is an illustration of an example of a display for performing take editing.

A description will be given of the edit of a take file. When a take file edit command is input through the operation key 42 of the remote controller 41, the apparatus is placed in the take file editing mode, and information of the take designated by the operator is displayed on the display unit 43. FIG. 18 shows an example of a take edit display appearing on a screen of the display unit 43 in the take file editing mode.

In FIG. 18, take information of the take file name "VOCAL" is shown. The length of the take indication bar shown in the figure indicates the reproduction time of the take. Additionally, cursors CRa, CRb are indicated by two vertical dotted lines. The two cursors CRa, CRb can be moved along the take indication bar by means of the operation key 42 of the remote controller 41.

When reproducing a desired part of the take, the desired part of the take is set by moving the cursors CRa, CRb. The part between the two cursors CRA and CRb is set to be the reproduction part. After setting the reproduction part, cursor position information with respect to the take is sent from the remote controller 41 to the CPU 22 by pressing a reproduction key of the operation key 42.

The CPU 22 reads out the DAD file corresponding to the take name, and determines, in accordance with the cursor position information sent from the remote controller 41, the number of offset bytes and the number of reproducing bytes. The CPU 22 transfers to the DSP 25 the data to be reproduced which data excludes the data corresponding to the offset bytes. By the above operation, the desired part of the take can be reproduced.

When deleting a desired part of the take, the desired part of the take is set by moving the cursors CRa, CRb. The part between the two cursors CRa and CRb is set to be a delete part. After setting the delete part, cursor position information with respect to the take is sent from the remote controller 41 to the CPU 22 by pressing a delete key of the operation key 42.

The CPU 22 deletes the delete part of the DAD file in accordance with the cursor position information sent from the remote controller 41. A take indication bar shortened due to the deletion is displayed on the screen of the display unit 43 of the remote controller 41.

Additionally, when performing cross fade processing, a plurality of takes to be coupled are designated and a cross fade command is input from the operation key 42. The CPU 22 sends to the DSP 25 the DAD file data of the designated takes so that a cross fade process is applied to the data. The processed data is then sent back and stored to the hard disk as a new DAD file.

Figure 19:
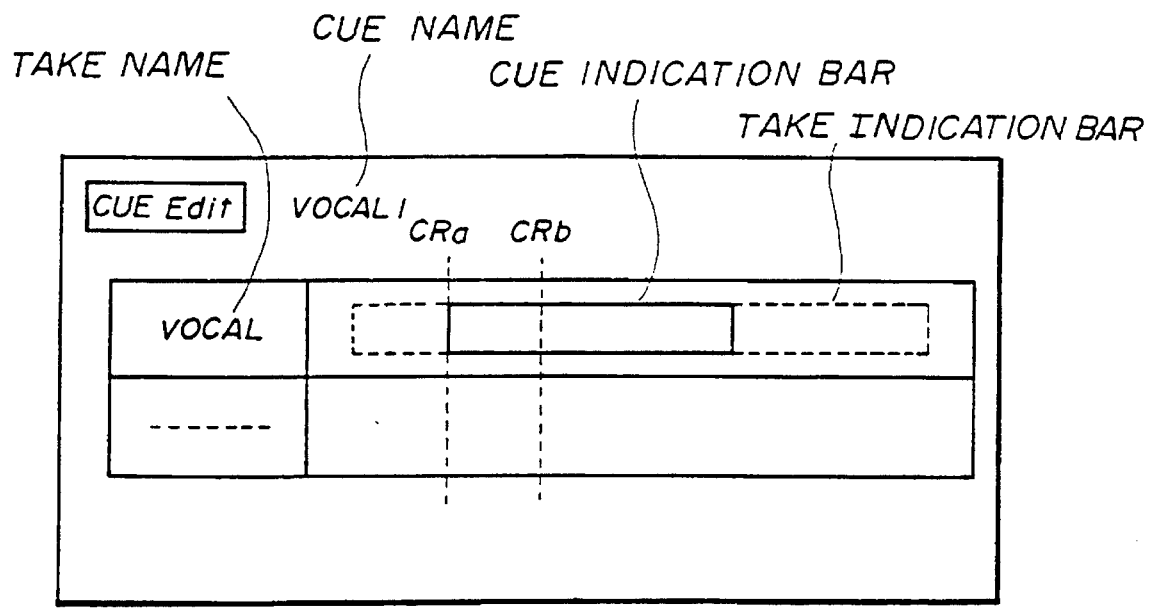
FIG. 19 is an illustration of an example of a display for performing cue editing.

A description will now be given of the edit for a cue file. When a cue file edit command is input through the operation key 42 of the remote controller 41, the apparatus is set in the cue file editing mode, and information of the cue designated by the operator is displayed on the display unit 43. FIG. 19 shows an example of a cue edit display appearing on the screen of the display unit 43 in the cue file editing mode.

In FIG. 19, cue information of the cue file name "VOCAL1" is shown. Since the cue file VOCAL1 is in associated with the take file VOCAL, the take name VOCAL is displayed on the screen. Additionally, a take indication bar (indicated by dotted lines) and a cue indication bar (indicated by solid lines) are displayed on the screen of the display unit 43.

The length of a take indication bar represents the reproduction time of the take, and the length of the cue indication bar represents the reproduction time of the cue. Additionally, cursors CRa, CRb are displayed as two vertical dotted lines. The two cursors CRa, CRb can be moved along the cue indication bar by means of the operation key 42 of the remote controller 41.

When reproducing a desired part of the cue, the desired part of the cue is set by moving the cursors CRa, CRb. The part between the two cursors CRa and CRb is set to be the reproduction part. After setting the reproduction part, cursor position information with respect to the cue is sent from the remote controller 41 to the CPU 22 by pressing a reproduction key of the operation key 42.

The CPU 22 reads out the DAD file corresponding to the take name indicated by the cue, and determines, in accordance with the cursor position information sent from the remote controller 41, the number of offset bytes and the number of reproducing bytes. The CPU 22 transfers to the DSP 25 the data to be reproduced which data excludes the data corresponding to the offset bytes. By the above operation, the desired part of the cue can be reproduced.

When deleting a desired part of the cue data, the desired part of the cue is set by moving the cursors CRa, CRb. The part between the two cursors CRa and CRb is set to be a delete part. After setting the delete part, cursor position information with respect to the take is sent from the remote controller 41 to the CPU 22 by pressing a delete key of the operation key 42.

The CPU 22 then changes the offset information (reproduction start position) and the reproduction time information in the cue sheet in accordance with the cursor position information sent from the remote controller 41. That is, deletion of the part of the cue is made by merely changing the offset information and the reproduction time information of the cue sheet, and thus the corresponding DAD file is unchanged. A cue indication bar shortened due to the deletion is displayed on the screen of the display 43 of the remote controller 41.

Figure 20:
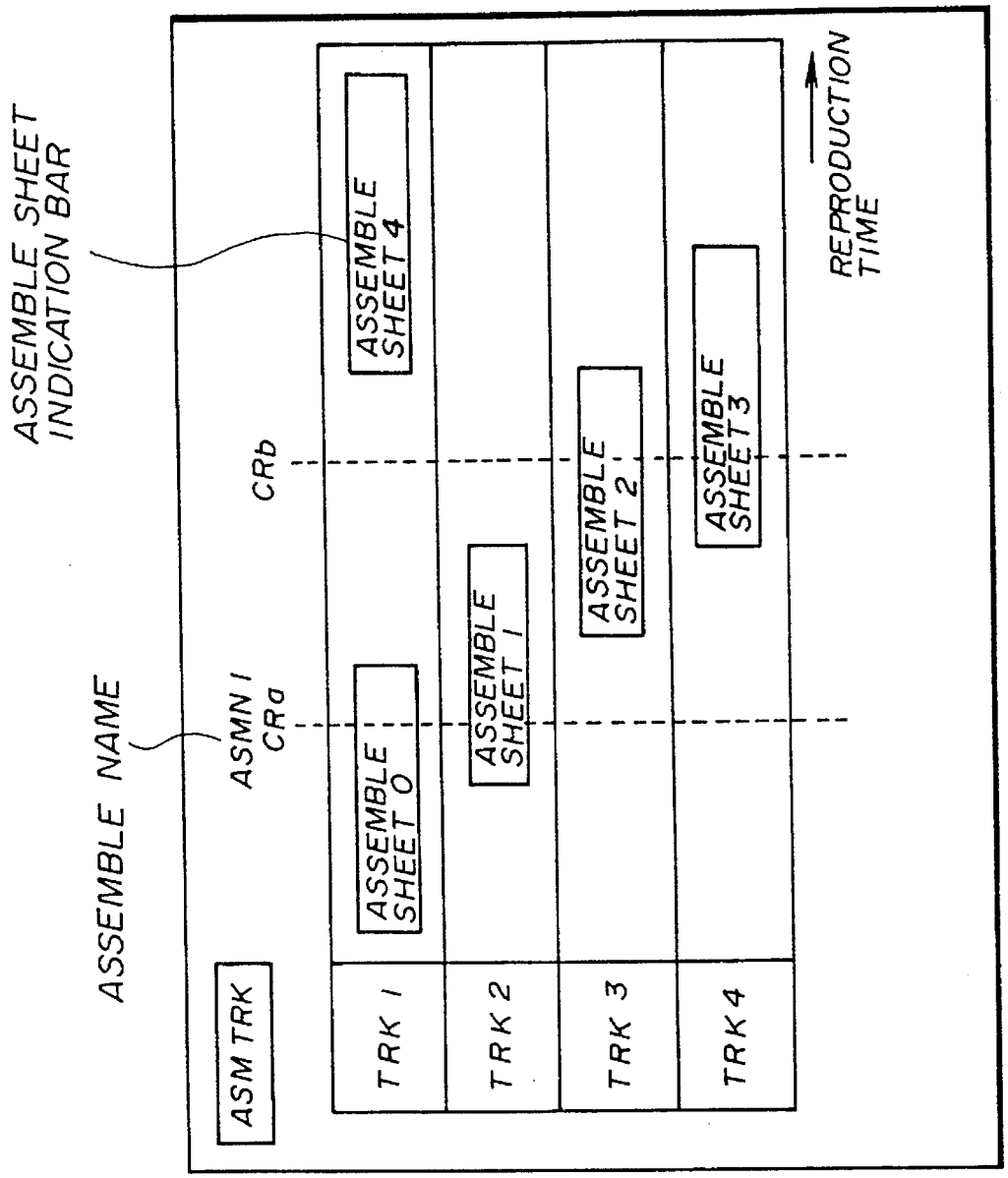
FIG. 20 is an illustration of an example of a display for performing assemble editing.

A description will now be given of the edit of an assemble file. When an asemble file edit command is input through the operation key 42 of the remote controller 41, the apparatus is set in the assemble file editing mode, and information of the assemble file designated by the operator is displayed on the display unit 43. FIG. 20 shows an example of an assemble file edit display appearing on the screen of the display unit 43 in the assemble file editing mode.

In FIG. 20, the positional relationship of the data on a reproduction time axis for track (TRK) 1 to track 4 is shown by means of an assemble sheet. Each assemble sheet is displayed as an assemble sheet indication bar. In FIG. 20, the assemble sheet 0 and the assemble sheet 4 are arranged on the track 1. The assemble sheet 1 to assemble sheet 3 are arranged on the track 2 to the track 4, respectively. The length of each assemble sheet indication bar represents the reproduction time of the corresponding data to be reproduced.

Additionally, cursors CRa, CRb are displayed as two vertical dotted lines. The two cursors CRa, CRb can be moved along the time axis by means of the operation key 42 of the remote controller 41.

When reproducing a desired part of the assemble, the desired part of the assemble is set by moving the cursors CRa and CRb. The part between the two cursors CRA and CRb is set to be the reproduction part. After setting the reproduction part, cursor position information is sent from the remote controller 41 to the CPU 22 by pressing a reproduction key of the operation key 42.

The CPU 22 reads out the data of each track in the part determined by the cursor position information, block by block, as described with reference to FIG. 16 and 17.

With respect to each assemble sheet, the CPU determines, in accordance with the cursor position information sent from the remote controller 41, the reproduction start position cluster number, the number of offset bytes, and the number of reproducing bytes of the corresponding DAD file. The CPU 22 transfers to the DSP 25 the data to be reproduced which data excludes the data corresponding to the offset bytes. By the above operation, the desired part of the assemble can be reproduced.

When deleting a desired part of the data, the track number to be edited is designated, and the desired part of the data is set by moving the cursors CRa, CRb. The part between the two cursors CRa and CRb is set to be the delete part. After setting the delete part, the designated track number and cursor position information is sent from the remote controller 41 to the CPU 22 by pressing a delete key of the operation key 42.

The CPU 22 then changes the offset information (reproduction start position), the reproduction time information and the cue reproduction start time information in the assemble cue sheet, in accordance with the cursor position information sent from the remote controller 41. That is, deletion of the part of assemble is made by merely changing the offset information, the reproduction time information and the cue reproduction start time information of the assemble cue sheet, and thus the corresponding DAD file is unchanged.

It should be noted that due to the deletion, the reproduction start cluster number, the number of offset bytes, the number of reproducing bytes and the reproduction start time of the assemble sheet corresponding to the changed assemble cue sheet is changed. If an entire assemble sheet is deleted, the corresponding assemble cue sheet is also deleted.

On the screen shown in FIG. 20, when deletion of the part on the track 1 between the cursors CRa and CRb is completed, the portion of the assemble sheet 0 to the right of the cursor CRa is deleted, and the assemble sheet 4 is moved to the left by a distance corresponding to the distance between the cursors CRa and CRb.

It should be noted that deletion can be made by designating an assemble sheet. In this case, the designated assemble sheet is entirely deleted, and the corresponding assemble cue sheet is also deleted.

Additionally, when performing cross fade processing, a plurality of assembles to be coupled are designated and a cross fade command is input from the operation key 42. The CPU 22 sends to the DSP 25 the DAD file data of the designated assembles so that cross fade process is applied to the data. The processed data is then sent back and stored to the hard disk as a new DAD file, and one assemble sheet including the cross fade information is produced.

The present invention is not limited to the specifically disclosed embodiments, and variations and modifications may be made without departing from the scope of the present invention.

What is claimed is:

1. An audio signal recording and reproducing apparatus which records input audio signals as digital audio data, and reproduces and outputs the input audio signals using the recorded digital audio data as output audio signals, said audio signal recording and reproducing apparatus comprising:

input audio signal processing means for converting said input audio signals into digital audio data;

data file recording means for recording said digital audio data, as digital audio data file information, on a recording medium, said recording medium having a plurality of clusters in which data having a predetermined number of bytes is recorded, said digital audio file information being recorded over a plurality of clusters;

file management information recording means for recording on said medium file management information which represents a reproducing order of said clusters in which said digital audio data file information is recorded;

directory information recording means for recording on said recording medium directory information, which includes at least a number of a first cluster recorded first when series of said digital audio data is recorded, a file name and a data length of said digital audio data file information;

reproduction procedure file information recording means for recording on said recording medium reproduction procedure file information which includes at least the number of the first cluster of a digital audio data file to be reproduced;

cue file information recording means for recording cue file information on said recording medium, said cue file information including cue sheet information which designates a portion of said digital audio data file information, and wherein said portion of said digital audio data file being designated by said cue sheet information is reproduced; and output audio signal processing means for converting said digital audio data, which is read out from said recording medium in accordance with said reproduction procedure file information, into said output audio signals being output from said audio signal recording and reproducing apparatus.

2. The audio signal recording and reproducing apparatus as claimed in claim 1, wherein said reproduction procedure file information includes assemble file information, said assemble information comprising assemble cue sheet information and comprising assemble sheet information, said assemble cue sheet information being produced corresponding to said cue sheet information and including at least a name of the corresponding cue sheet information, a reproduction start position and reproduction time, said assemble sheet information being produced corresponding to said assemble cue sheet information and including a name and a first cluster number of said digital audio data file corresponding to said cue sheet information designated by said assemble cue sheet information.

3. The audio signal recording and reproducing apparatus as claimed in claim 1, being connected to an external time generator which supplies time information, and wherein said assemble sheet information includes information which designates a reproduction start time with respect to said time information.

4. The audio signal recording and reproducing apparatus as claimed in claim 1, further comprising a display unit which displays said reproduction procedure file information and an inputting unit through which additional information is added to said reproduction procedure file information or said reproduction procedure file information is changed.

5. The audio signal recording and reproducing apparatus as claimed in claim 1, wherein said recording medium is a hard disk.

6. A signal recording and reproducing apparatus which records a series of input signals as a set of data, and reproduces and outputs a part of the input signals using the recorded data as output signals, said signal recording and reproducing apparatus comprising:

a recording medium on which at least one data file storing the set of data is recorded, said recording medium being divided into a plurality of recording areas, said data file being recorded over a combination of a single recording area;

file management information storing means for storing pointer information which sequentially indicates a position of each of said recording areas occupied by the data file on said recording medium;

directory information storing means for storing together a name of said data file and the pointer information corresponding to said data file, the pointer information designating one of said recording areas which is positioned in the first place of said data file so that the pointer information is referred to when said data file is managed;

reproduction procedure information storing means for storing reproduction procedure information which comprises the pointer information of the data file including designated data to be reproduced, offset information and size information of the designated data to be reproduced in said data file, the pointer information indicating one of the recording areas corresponding to the data file including the designated data to be reproduced, said one of the recording area being the recording area to be reproduced first, the offset information indicating a data length which is not reproduced, the data length being from a head of said recording area to be reproduced first to a position from which the designated data is recorded, the size information indicating a length of the designated data to be reproduced; and reproducing means for reproducing the designated data to be reproduced by referring to the pointer information, the offset information and the size information stored in said reproduction procedure information storing means.

7. The signal recording and reproducing apparatus as claimed in claim 6, wherein the position information stored in said reproduction procedure information storing means includes a first recording area of the designated data to be reproduced on said recording medium and an offset length of data not to be reproduced from a first position of the first recording area of the designated data.

8. The signal recording and reproducing apparatus as claimed in claim 6, further comprising a display unit which displays said reproduction procedure information and an inputting unit through which said reproduction procedure information is changed.

9. The signal recording and reproducing apparatus as claimed in claim 6, wherein said recording medium is a disk on which said recording areas are provided, and said recording areas comprise clusters having a uniform data size.

* * * * *